United States Patent
Egloff et al.

(10) Patent No.: US 8,045,159 B2
(45) Date of Patent: Oct. 25, 2011

(54) OPTICAL APPARATUS OF A STACKED DESIGN, AND METHOD OF PRODUCING SAME

(75) Inventors: Thomas Egloff, Schwarza (DE); Jens Knobbe, Dresden (DE); Heinrich Grueger, Dresden (DE)

(73) Assignee: Fraunhofer-Gesellschaft zur Foerderung der angewandten Forschung e.V., Munich (DE)

( * ) Notice: Subject to any disclaimer, the term of this patent is extended or adjusted under 35 U.S.C. 154(b) by 145 days.

(21) Appl. No.: 12/425,582

(22) Filed: Apr. 17, 2009

(65) Prior Publication Data

US 2009/0262346 A1    Oct. 22, 2009

(30) Foreign Application Priority Data

Apr. 18, 2008    (DE) .................. 10 2008 019 600

(51) Int. Cl.
*G01J 3/28* (2006.01)

(52) U.S. Cl. ........................................ 356/328

(58) Field of Classification Search .............. 356/326, 356/328; 359/316; 438/50; 257/E21.499
See application file for complete search history.

(56) References Cited

U.S. PATENT DOCUMENTS

| | | | |
|---|---|---|---|
| 5,579,149 A | 11/1996 | Moret et al. | |
| 6,359,718 B1 | 3/2002 | Lin et al. | |
| 6,657,771 B2 * | 12/2003 | Okayama | 359/290 |
| 7,027,152 B2 | 4/2006 | Schenk et al. | |
| 7,126,686 B2 * | 10/2006 | Tsujita | 356/328 |
| 2002/0105699 A1 | 8/2002 | Miracky et al. | |
| 2004/0087043 A1 | 5/2004 | Lee et al. | |
| 2007/0159635 A1 | 7/2007 | Urey et al. | |
| 2007/0252990 A1 | 11/2007 | Grueger | |

FOREIGN PATENT DOCUMENTS

| | | |
|---|---|---|
| DE | 196 26 969 A1 | 1/1998 |
| DE | 199 32 807 A1 | 1/2001 |
| DE | 10 2006 019 840 A1 | 11/2007 |
| WO | 99/18612 A2 | 4/1999 |
| WO | 03/069290 A1 | 8/2003 |
| WO | 2007/050123 A2 | 5/2007 |

OTHER PUBLICATIONS

Lo et al.; "Multi-Cantilever-Driven Rotational Micrograting for MOEMS Spectrometer"; Solid-State Sensors, Actuators, and Microsystems Conference, 2007; Transducers & Eurosensors Jun. 10-14, 2007, pp. 2421-2424.

(Continued)

*Primary Examiner* — Tarifur Chowdhury
*Assistant Examiner* — Abdullahi Nur
(74) *Attorney, Agent, or Firm* — Keating & Bennett, LLP

(57) ABSTRACT

An optical apparatus includes a first substrate including an optical functional element, and a second substrate including a movable micromechanical functional element, the first substrate and the second substrate being connected in a stacked manner, so that a light path exists which is convoluted between the first substrate and the second substrate, the movable micromechanical functional element and the optical functional element being arranged in the light path. In addition, a method of producing an optical apparatus includes producing a first substrate including an optical functional element, and producing a second substrate including a movable micromechanical functional element, as well as connecting the first and second substrates, so that a light path exists which is convoluted between the first and second substrates, the movable micromechanical functional element and the optical functional element being arranged in the light path.

25 Claims, 15 Drawing Sheets

OTHER PUBLICATIONS

Zimmer et al.; "Development of a NIR Micro Spectrometer Based on a MOEMS Scanning Grating"; Proc. SPIE; vol. 5455; 2004, pp. 9-18.
Lo et al.; "Wafer-Level Packaging of Three-Dimensional MOEMS Device With Lens Diaphragm"; IEEE 20th International Conference on Micro Electro Mechanical Systems, Jan. 21-25, 2007, pp. 715-718.

* cited by examiner

OPTICAL APPARATUS OF A STACKED DESIGN, AND METHOD OF PRODUCING SAME

CROSS-REFERENCE TO RELATED APPLICATIONS

This application claims priority from German Patent Application No. 102008019600.2, which was filed on Apr. 18, 2008 and is incorporated herein in its entirety by reference.

Embodiments in accordance with the invention relate to an optical apparatus, also referred to below as an optical system or, generally, a system, of a stacked design which comprises an optical functional element and a movable micromechanical functional element, and to a method of producing such an optical apparatus.

Some embodiments in accordance with the invention relate to MOEMS (micro-opto-electromechanical system) spectrometer modules which are integrated in a hybrid manner.

BACKGROUND OF THE INVENTION

Nowadays, spectrometers are employed, inter alia, for identifying materials or substances, such as for analyzing foodstuffs, in process measurement engineering for regulating and monitoring the composition of materials, and for quality control. The prerequisite for this are spectrometer modules which may be manufactured at low cost and are robust against various environmental impacts, such as dust, extreme temperatures and high levels of humidity, for example. This conflicts with the high demands associated with the various assemblies. In a spectrometer consisting of optical, mechanical, electronic and partly micromechanical components, adjustment and installation of the optical, mechanical and micromechanical components is important to the functioning of the system.

A multitude of spectrometer types, based on most various system concepts, have been known. In principle, spectrometers for measuring or characterizing the spectral composition of electromagnetic radiation may be classified into two types: spectrometers which passively modulate radiation, and spectrometers which actively modulate radiation. Typical representatives of passively modulating spectrometers are grating spectrometers comprising line scan detectors. With this spectrometer type, radiation impinging on a one-dimensional detector array is spectrally split up, as a result of which said systems have a limited spectral resolution and a limited spectral measuring range, and the multitude of detectors of a detector array lead to a deviation of the signal intensity, or signal sensitivity, on account of various levels of sensitivity and amplification. Spectrometers which actively modulate electromagnetic radiation comprise components for modulating radiation and for detecting the modulated radiation. These systems generally exhibit a relatively high resolution and a relatively large detectable spectral range, and they may be employed for relatively large spectral ranges on account of the utilization of individual detectors. In addition, these spectrometers are cheaper and exhibit no deviation in the signal sensitivities. On the basis of the developments occurring in lithographic manufacturing, it is now possible to produce components of these systems by lithography. However, the advantages of said technology cannot be fully exploited so far, since the savings in terms of the amount of work involved in the production of the individual components is compensated for by the more complicated adjustment and installation.

Systems for detecting the spectral distribution of electromagnetic radiation may also be subdivided in accordance with the production technology employed in conjunction with their design, for example into systems which are almost entirely built of discrete components, and systems build of functionally integrated assemblies. With spectrometers which are almost entirely built of discrete components, discrete optical, micromechanical, mechanical and electronic devices, which are manufactured in different processes, respectively, are combined into one overall system by means of adjustment and installation, which generally is costly. Only one spectrometer module may be produced per operating cycle, as a result of which the production cost and, therefore, the total prices of these systems are high. As a result, application of these systems on the mass market is limited. Spectrometers built of functionally integrated assemblies exhibit assemblies wherein functional groups are monolithically integrated within one device. Subsequently, they are adjusted and installed, depending on the implementation. To this end, particularly optical and mechanical components are frequently manufactured by plastic injection molding. The design and production of these subsystem enables these systems to be produced at lower cost than systems made of discrete components. Due to the components being shrunk, they exhibit a surface roughness and thermal deformation which is too high for optical components, and they therefore exhibit lower optical efficiency (diffraction efficiency grating, surface roughness, . . . ), which results in a poorer signal/noise ratio, lower spectral resolution, and a poorer stray-light behavior. Due to restrictions in the production by plastic injection molding, invariance toward environmental impacts cannot be achieved. Due to the large tolerances, advantageous concepts for spectrometers comprising micromechanical components are difficult to put into practice. The high manufacturing requirements placed upon the optical and mechanical components, in particular, considerably increase the cost of the production. This applies, in particular, to modeling the frequently used diffraction gratings, which previously were manufactured by means of lithography or ultra-precision processing.

Various optical apparatuses or parts of optical apparatuses, specifically in the field of spectrometers, have already been known. For example, US 2007/0159635 A1 describes a Fourier transformation spectrometer comprising a binary grating with a variable depth, the grating comprising a first set of mirrors and a second set of mirrors, the mirrors of the first set of mirrors and the mirrors of the second set of mirrors being arranged in an alternating order, and at least one of the sets of mirrors being supported by fingers of a comb structure of a wafer (disc-shaped substrate). In addition, the spectrometer comprises an actuator for driving a movement of the second set of mirrors, and a detector for detecting radiation reflected by the grating. The mirrors are oriented within a plane defined by said wafer, and said movement of the second set of mirrors is defined by a translation in a direction vertical to said wafer.

In addition, WO 03/069290 A1 describes a quasi-static deflection apparatus for spectrometers. For the dispersive element of a spectrometer, a suspension mechanism which pretensions same in an idle position, and, for deflecting, a means for retaining the dispersive element in a deflected position, are used, such that a balance of forces is obtained between the retaining force and the pretensioning force. In this manner, following impacts or vibrations, the dispersive element will again and again return to the position defined by the retaining force. An inventive spectrometer therefore comprises a dispersive element and a suspension mechanism for supporting the dispersive element and for pretensioning same into an idle position using a pretensioning force when the dispersive element is in a deflected position. A control means controls a retaining means to vary the deflected position, so that different spectral constituents become detectable for a detector of the spectrometer.

DE 102006019840 A1 describes a line scan camera for spectral image detection. What is shown is an apparatus for detecting spectral information along a geometric line comprising a dispersive element suspended on an axis of rotation, for spectrally decomposing electromagnetic radiation from one area on the geometric line into spectral constituents, a line scan detector for detecting the spectral constituents of the radiation emanating from the area on the geometric line, and a means for deflecting the dispersive element, the means for deflecting being configured to deflect the dispersive element about the axis of rotation, so that, depending on a deflection angle, radiation from a another area on the geometric line impinges on the line scan detector.

In addition, DE 196 26 969 A1 describes a spectrometer system for spatially and temporally dissolved spectral analysis. DE 196 26 969 A1 describes a miniaturizable multichannel spectrometer system. A light-guiding space is subdivided into several sub-areas which comprise, at one of their ends, respectively, a grating structure where the light is diffracted and reflected, and is thus subdivided into its spectral components, and, at the other end, respectively, an apparatus for input light coupling and output light coupling.

DE 199 32 807 A1 describes an entrance slit for a spectrometer, consisting of a movable diaphragm and a fixed diaphragm. The width of the slit may be modulated periodically. The document mentioned describes a drive for the movable diaphragm, with which drive the inside width of the entrance slit may be periodically changed in a specifiable manner.

Moreover, WO 99/18612 A2 describes integrating several optical elements at the wafer level. Integrated optical elements may be formed by connecting substrates which contain optical elements, or by providing wafer substrates with optical elements on both sides.

US 2002/0105699 A1 describes integrated optical, micro-electromechanical systems and a method of producing same. In this context, micro-optical elements are integrated with micro-electromechanical actuators so as to provide an assembly for a micro-optical communication apparatus. These micro-optical communication apparatuses may realize a multitude of communication systems, such as optical connections, laser communication or fiber-optical switches. With regard to one aspect, a micro-optical element such as a microlens, for example, is integrated with an actuator as well as with a micro-electromechanical comb-drive actuator so as to form a micro-electromechanical lens assembly.

In addition, US 2004/0087043 A1 describes a housing structure and a method of producing same. In this context, substrates may be aligned with and pre-connected to integrated or assembled elements. Liquid casting materials may be employed to seal the residual openings of the pre-connected interfaces of the substrates. Three-dimensional and projecting microstructures, elements and micro-electromechanical elements may be accommodated and protected within the space formed by the connected substrates.

WO 2007/050123 A2 describes an optical microspectrometer comprising a multi-layer structure. The structure may be manufactured by micro-electromechanical technology. A reflective grating, such as a diffractive or holographic grating, for example, which is located, with a light emission point and a detector, at the circumference of a Rowland circle, may be a configuration of the spectrometer.

SUMMARY

According to an embodiment, an optical apparatus may have: a first substrate having an optical functional element; a second substrate having a movable micromechanical functional element; the first substrate and the second substrate being arranged and interconnected in a stacked manner and, so that a light path exists which is convoluted between the first substrate and the second substrate, the movable micromechanical functional element and the optical functional element being arranged in the light path; and a third substrate including a microelectronic functional element, the second substrate being arranged between the first substrate and the third substrate.

According to another embodiment, a method of producing an optical apparatus may have the steps of: producing a first substrate having an optical functional element; producing a second substrate having a movable micromechanical functional element; producing a third substrate including a movable microelectronic functional element; connecting the first and second substrates in a stacked manner, so that a light path is formed which is convoluted between the first and second substrates, the movable micromechanical functional element and the optical functional element being arranged in the light path; connecting the second and third substrates such that the second substrate is arranged between the first and third substrates.

One embodiment in accordance with the invention provides an optical apparatus which comprises a first substrate having an optical functional element, and a second substrate having a movable micromechanical functional element, and wherein the first substrate and the second substrate are connected in a stacked manner, so that a light path exists which is convoluted between the first and second substrates. The movable micromechanical functional element and the optical functional element are arranged within the light path.

The first substrate will also be referred to below as an "optical substrate", for example. The second substrate will also be referred to as a "micromechanical substrate", for example. In addition, a functional element will also be referred to only as an "element" for short.

Embodiments in accordance with the invention are based on the core idea that the convoluted light path between the optical and the micromechanical substrates enables a compact and, therefore, inexpensive design, while the movable micromechanical element is arranged, in a protected manner, in an interior of the arrangement at the same time, and wherein the stacked design further results in a precise and simple alignment of the movable micromechanical element relative to the optical functional element. The movable micromechanical functional element is designed to influence radiation in a modulating (e.g. in a variably changeable) manner.

In some embodiments, advantages result from the possibility of completely or almost completely integrating an optical apparatus, and from the possibility of simultaneous parallel production of several modules, for example by wafer-level integration or by chip-scale integration.

A specific technology which may be used for producing (micro-)optical, mechanical, micromechanical and microelectronic elements generally cannot be adapted at all or only with great difficulty, since said technology is determined by the respective specific requirements. By means of the system design and the arrangement of the various functional elements on the various substrates, in some embodiments the technology may be optimally adapted to those functional elements which may be realized using the same technology.

Therefore, in some embodiments the various functional elements required for an optical apparatus may be combined into functional groups (for example the micromechanical functional elements or the optical functional elements). In some embodiments, as large a number of functional elements of a functional group as possible may be produced simultaneously on the same substrate by means of the technology which is optimal for the respective group, so as to thereby achieve an advantage in terms of cost. For example, optical elements such as concave mirrors, convex mirrors and lenses may readily be produced by a technology which, for example, is specifically adapted and which comprises being able to pattern curved surfaces in or on a substrate. Thus, the optical substrate of the optical apparatus may be produced using such a technology, for example.

For micromechanical structures, in turn, a technology may be used which utilizes a substrate, such as SOI (silicon on isolator). For example, the micromechanical substrate of the optical apparatus may be produced, for example, in such a technology which may possibly be specifically adapted. Simultaneous production may also be understood to mean production steps, such as an automated sequential exposure or implantation step, for example.

In some embodiments in accordance with the invention, the functional elements may be arranged such that they generate a convoluted light path when the various substrates are connected. This enables, for example, producing many identical subsystems on a substrate at the same time, and to dice the finished or partly finished systems not until after the individual substrates have been connected, which may further reduce the cost per system.

In some embodiments, adjusting the wafers enables parallel accurate alignment of many sub-assemblies, a high level of accuracy being achieved in combination with a very high level of reproducibility, for example due to a high level of planarity of the substrates and to utilization of lithographic means for alignment.

By joining, for example gluing, so-called wafer bonding (connecting disc-shaped substrates) or soldering the wafers or substrates in a clean-room atmosphere, a reduction of the dust particles within the spectrometer module may be achieved, among other things, which dust particles would result in poorer functioning of the system. For all of the further work steps, such as coating with a protective resist, dicing or cleaning, the amount of work involved may be reduced significantly. By using micromechanical elements for modulating electromagnetic radiation, for example the spectral resolution and the signal/noise ratio (SNR) may be improved, advantageous spectrometer systems may be realized, and individual detectors may be used instead of detector arrays. In addition, a micromechanical subsystem may be provided which enables reference measurement and/or enlargement of the spectral range detected.

As compared to spectrometers designed in accordance with conventional technology, spectrometers in accordance with the invention may be realized, for example, at lower cost and such that they are more efficient and more robust against environmental impacts. By optimizing, e.g., the three parameters of cost, efficiency, and invariance toward environmental impacts, utilization of spectrometers as sensor modules on the mass market is made possible.

In some embodiments in accordance with the invention, all imaging optical elements, such as concave mirrors or lenses, for example, are arranged in or on the optical substrate, and all movable micromechanical functional elements are arranged in or on the micromechanical substrate so as to produce the systems at low cost.

In some embodiments in accordance with the invention, an optical functional element or a micromechanical functional element may be arranged such that radiation may be coupled into or coupled out of the convoluted light path between the optical substrate and the micromechanical substrate.

In further embodiments in accordance with the invention, the optical apparatus is designed as a miniaturized low-cost spectrometer module. Additionally, a technology for producing the spectrometer modules in a simple manner and at low cost is provided. The module serves to analyze and/or measure the spectral composition of electromagnetic radiation within the wavelength range from ultraviolet UV (approx. 1 nm to 380 nm) via the visible VIS (from 380 nm to 780 nm) up to infrared IR (780 nm to 1 mm) or sub-ranges of these spectral regions. By means of advantageous integration of a unit for illuminating a sample to be analyzed and for coupling in the electromagnetic radiation interacting with a sample (for example direct reflection, scattering, Raman scattering, transmission, absorption, fluorescence, or phosphorescence), said unit may be used in combination with evaluating the spectral data for analysis, for measuring, for comparing and/or for checking the chemical composition of a sample, of a material or of a substance.

In some embodiments in accordance with the invention, realization of the spectrometer module is performed by integrating the (micro-)optical, mechanical, micromechanical and/or (micro)electronic components in or on various substrates. Subsequent application of structural design and connection technology ("packaging"), such as wafer level packaging, for example, or chip-scale packaging, provides the possibility of producing an efficient spectrometer module. Parallel production of many modules within one work cycle results in inexpensive and reproducible production with a high level of efficiency of the modules. By means of the production technology it is further possible to realize various spectrometer types, such as grating spectrometers, transformation spectrometers or spatial-resolution spectrometers, as a module which is integrated in a hybrid manner. In this context, the system comprises, for example, all of the important components, such as one or more imaging optical functional elements, one or more micromechanical functional elements designed, for example, for spectrally splitting up electromagnetic radiation, one or more detectors for detecting the electromagnetic radiation, and electronic components designed, for example, for driving, or controlling, the micromechanical functional element, for signal processing of the detector, for signal evaluation or for communicating with other electronic components or appliances.

In further embodiments in accordance with the invention, the spectrometer module is realized in that the optical, mechanical, micromechanical and/or (micro)electronic components are integrated in or on various substrates. Various known spectrometer principles may be realized by utilizing micromechanical components enabling modulation of electromagnetic radiation, the modulator being able to change the radiation with regard to the spectrum of angles, to the local distribution of radiation, to the composition of the wavelength spectrum, to the polarization state, or to any combination of these. For example, grating spectrometers in accordance with the Czerny-Turner principle, transformation spectrometers, classical Fourier transformation spectrometers (Michelson interferometers), Hadamard transformation spectrometers, or spectrometers comprising tunable filters, for example comprising a Fabry-Perot interferometer or an acousto- or electro-optical modulator or liquid crystals may be realized. In addition, depending on the radiation source or illumination source employed, the spectrometer module may be used for spectroscopy in the ultraviolet wavelength range (UV), in the visible wavelength range (VIS), in the near-infrared wavelength range (NIR), and in the infrared wavelength range (IR), as well as for Raman spectroscopy and/or for fluorescence spectroscopy.

In some embodiments in accordance with the invention, the elements which are producible by the same technology and in or on similar substrate materials are advantageously integrated in or on a substrate, respectively. For example, the first substrate, also referred to below as an optical substrate, has optical elements, such as elements for beam shaping, beam directing, beam splitting, filtering (locally, spatially and/or spectrally) and/or for spectral splitting of electromagnetic radiation patterned thereon. The second substrate, also referred to below as a micromechanical substrate, has micromechanical elements or passive elements, for example gratings, diffractive optical elements or photonic crystals, in corresponding lithographic technology, such as in silicon micromechanics on an SOI (silicon-on-insulator) wafer, for modulating, deflecting and/or spectrally splitting electromagnetic radiation, and diaphragms, or apertures, for local and/or spatial filtering patterned thereon. Advantageously, the surfaces are provided with a reflective layer, such as aluminum, silver, gold, and/or AlMgSi, but may also be provided with a stack of layers.

Some embodiments in accordance with the invention comprise a third substrate, also referred to below as a microelectronic substrate, which is processed using a lithographic, microelectronic technology such as in CMOS (complementary metal-oxide semiconductor) technology, and which may contain all of the electronic circuits or parts of electronic circuits (e.g. of electric circuits for driving the micromechanical element and/or for evaluating a detector signal) as well as radiation sources and detectors. However, radiation sources and detectors may also be arranged separately, for example by "bonding" (method of connecting electronic components, for example) and/or gluing, on the micro-electrical substrate or any other substrate.

Further embodiments in accordance with the invention comprise a further substrate which acts as a spacer. Said spacer substrate, also referred to below as a spacer, contains openings so that optical radiation may propagate, in the areas desired, between the optical substrate and/or the micromechanical substrate and/or the microelectronic substrate, or wafer, comprising one or several microelectronic circuits, and said spacer consequently, or simultaneously, has the task of minimizing scattered light and/or extraneous light. This results in a convoluted light path, which enables a compact design. This substrate may be made in such a way that it absorbs electromagnetic radiation at least within that wavelength range for which the system is designed, which may be effected, for example, by a substrate made of absorbent material, by a coating comprising absorbent material, such as PSK 2000, PSK 1000 or DARC 300, for example, and/or by a patterned surface comprising carbon nano tubes. The spacer substrate may be produced both by lithographic technology and by a different technology such as plastic injection molding, laser processing, milling and/or drilling, for example.

In some embodiments in accordance with the invention, a spectrometer module is built, as a stack, of the individual substrates. The stacked design is defined in that the individual substrates or parts of same are arranged one on top of the other and are directly or indirectly in contact with one another. It shall be defined that this is also the case when materials such as adhesives, solder or a spacer substrate, for example, are located between same. In other words, a first substrate and a second substrate are considered as being "stacked" even when the first and second substrates are not directly connected to each other, but even when, for example, a spacer substrate is arranged between the first and second substrates. The positions of the individual substrates, or assemblies, may be determined or defined by this contact, on the basis of the evenness of the substrates, or of sub-areas of said substrates, or of contact faces which are configured or structured to be equivalent or contrary to one another. Said contact faces may be expanded by structures for improved positional definition. Adjustment of the various substrates relative to one another may moreover be realized, for example, in a simple and accurate manner by using adjusting marks, adjusting structures or integrated diffractive optical elements. Installation of the substrates with regard to one another may be performed such that the individual modules are closely encapsulated by the process. The wafer stack is diced by a separating manufacturing process, such as sawing with a wafer saw. In particular the (micro-)optical, micromechanical and microelectronic components, which are sensitive to dust, sawings and cooling water, can be efficiently protected by the close installation, prior to the dicing of the spectrometer modules, which results in a lower level of scattered light and in a higher yield of systems produced in a defect-free manner.

Moreover, the spectrometer modules are small and/or robust, exhibit low variance toward environmental impacts, are low in cost due to the production using standard technology, and are suitable for the mass market due to the parallel processing or production of the components and individual substrates, and due to parallel adjustment and installation.

Some embodiments in accordance with the invention relate to the design and the production technology of spectrometers, produced in micro-technologies, for wavelength-resolved measurement of electromagnetic radiation, which include components for actively modulating this radiation. This refers, for example, to radiation of wavelengths starting with UV radiation and proceeding to visible radiation (VIS) and to IR radiation. The design of the system enables low-cost and simple production with a high level of adjustment accuracy due to the advantageous technological integration of optical, micromechanical and electronic components. The design of the spectrometer is implemented such that the (micro-)optical, mechanical, micromechanical and micro-electronic components are integrated on or in various substrates. The functional elements which may be produced by the same technology are integrated on a substrate in each case, which is why no change in existing technologies is necessary. Adjusting the various functional elements, which are arranged on different substrates in each case, is possible in a simple manner and with a high level of accuracy by exploiting the high level of evenness of the substrates, and by using adjusting marks, adjusting structures or integrated diffractive optical elements or modern means for aligning same. The unit which is fixed to form a stack (e.g. wafer stack) by a joining technique such as wafer bonding, gluing or soldering, for example, and/or by mechanical fixing connections such as clamping connections and/or screwed connections is diced into spectrometer modules by means of a separating method, such as sawing with a wafer saw, or laser cutting. By manufacturing many MOEMS spectrometer modules in parallel, efficient mass production of a hybrid overall system consisting of (micro-)optical, mechanical, micromechanical and/or (micro)electronic components, as has been common practice in microelectronics for a long time, is achieved.

In further embodiments in accordance with the invention, the spectrometer module consists of at least one (micro-) optical substrate, a spacer substrate, a micromechanical substrate and a microelectronic substrate. Optionally, most spectrometer modules may be equipped with an illumination unit. This module may also be built, by means of the technology described, as a substrate stack which is integrated in a hybrid manner. With this illumination means, a sample, or substance, is irradiated with electromagnetic radiation. The electromagnetic radiation interacting with the sample, or the radiation reflected back or generated by the sample (reflection, absorption, transmission, scattering, Raman scattering, fluorescence, phosphorescence, . . . ) is focused onto, or collimated in, the vicinity of an entrance diaphragm. The illumination unit may also be built by means of wafer-scale integration or chip-scale integration.

In some embodiments in accordance with the invention, the optical apparatus is designed to variably select a sub-range from the electromagnetic spectrum, and to provide the sub-range selected. In this context, the system includes all of the important components, such as one or more imaging functional elements, one or more micromechanical functional elements designed, for example, to spectrally split electromagnetic radiation, a radiation source and electronic components designed, for example, to drive the micromechanical functional element, to drive the radiation source, or to communicate with other electronic components or appliances.

BRIEF DESCRIPTION OF THE DRAWINGS

Embodiments of the present invention will be detailed subsequently referring to the appended drawings, in which.

DETAILED DESCRIPTION OF THE INVENTION

Figure 1A:
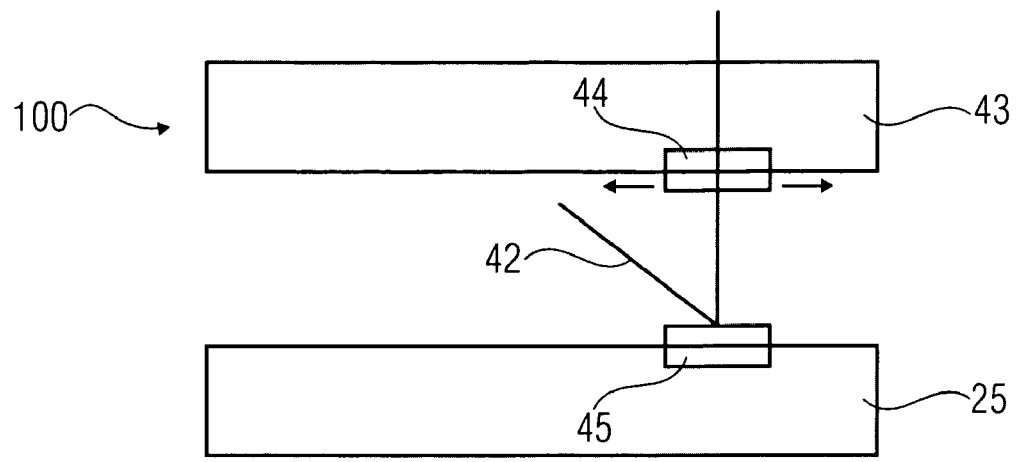
FIG. 1A shows a schematic cross-sectional representation of an optical apparatus in accordance with an embodiment of the invention.
Figure 1B:
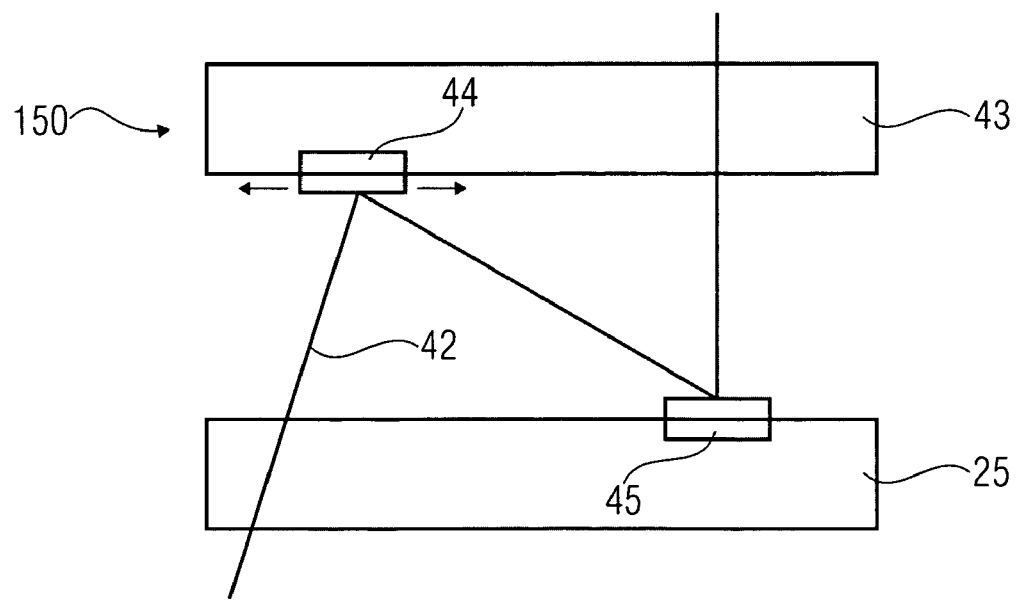
FIG. 1B shows a schematic cross-sectional representation of an optical apparatus in accordance with an embodiment of the invention.

FIGS. 1A and 1B show schematic cross-sectional representations of an optical apparatus in accordance with embodiments of the invention. The optical apparatuses are designated by 100 and 150, respectively, in their entireties. The apparatuses, or the systems, are built in a stacked manner of a first substrate 25, also referred to as an optical substrate, and of a second substrate 43, also referred to as a micromechanical substrate, at least one optical functional element 45 being arranged in or on the optical substrate 25, and at least one movable micromechanical functional element 44 being arranged in or on the micromechanical substrate 43. The first substrate 25 and the second substrate 43 are connected to each other in a stacked manner such that a light path 42 exists which is convoluted between the first substrate 25 and the second substrate 43, at least one movable micromechanical functional element 44 and at least one optical functional element 45 being arranged in the light path 42.

In addition, the first substrate 25 and the second substrate 43 may optionally be implemented such that, if need be, radiation is coupled into the convoluted light path 42 between the first substrate 25 and the second substrate 43 through the first substrate 25 or the second substrate 43, for example through an opening, or may be coupled out of the convoluted light path 42. In addition, the movable micromechanical functional element 44 may be used for influencing radiation which exists in the light path 42 between the first substrate 25 and the second substrate 43, or which propagates along the light path, in variably changing manner. The compact design of the optical apparatus 100, 150 enables low-cost production, among other things.

Figure 2:
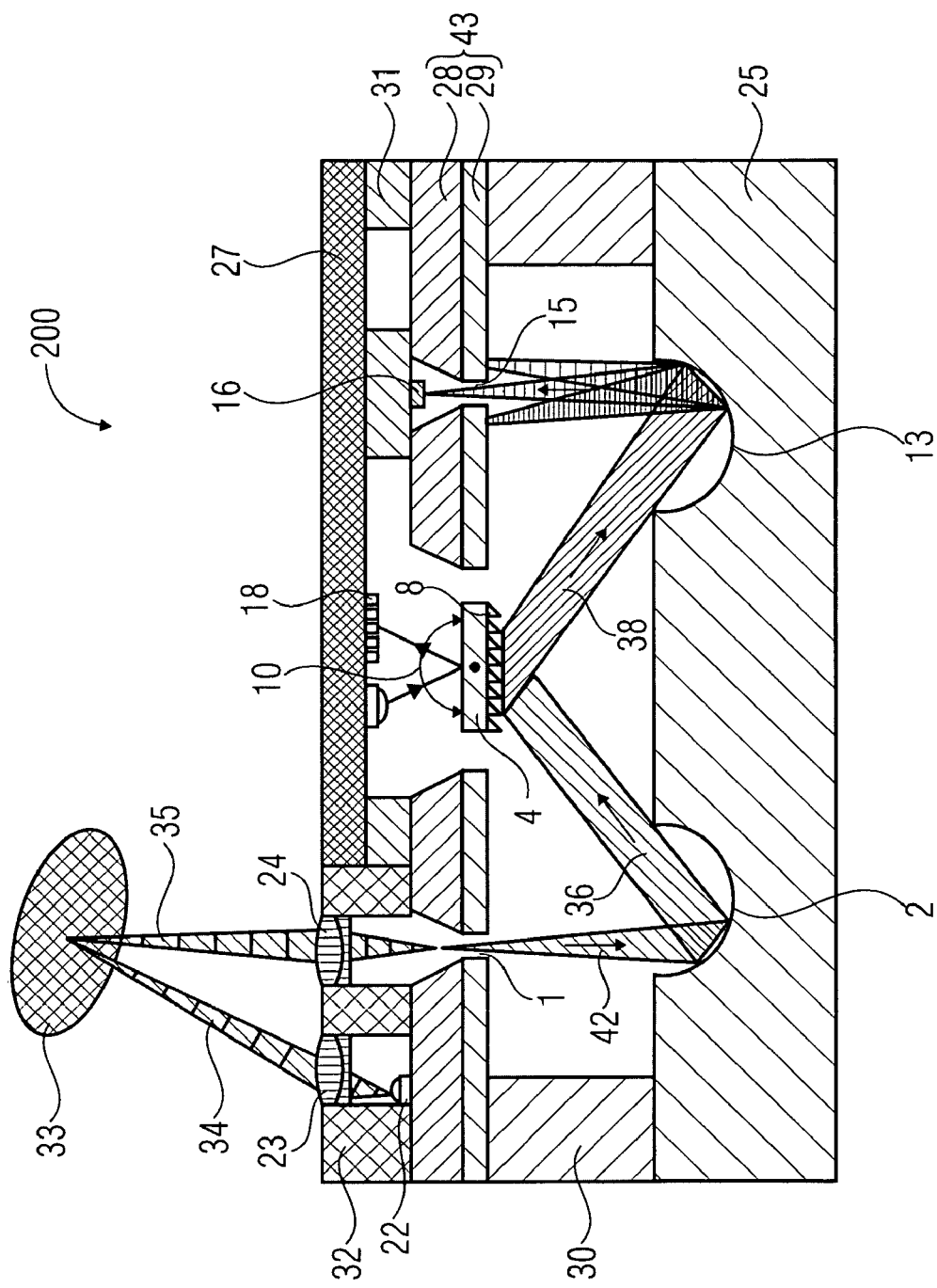
FIG. 2 is a fundamental outline, in the form of a cross-sectional representation, of an integrated MOEMS spectrometer in accordance with the Czerny-Turner principle which comprises an integrated illumination unit.

FIG. 2 shows a fundamental outline, in the form of a cross-sectional representation, of an integrated MOEMS spectrometer in accordance with the Czerny-Turner principle which comprises an integrated illumination unit in accordance with an embodiment of the invention. The spectrometer is designated by 200 in its entirety. The system comprises, in a successively stacked manner, an optical substrate 25, a first spacer substrate 30, a micromechanical substrate 43, a second spacer substrate 31, and a microelectronic substrate 27. The micromechanical substrate 43 may be an SOI wafer 28+29 (silicon-on-isolator wafer), for example, wherein 28 designates the handle layer of the SOI wafer, and 29 designates that layer of the SOI wafer within which a movable micromechanical functional element may be patterned. At the position where a movable micromechanical functional element is located, the handle layer is removed so as to enable unimpeded movement of the micromechanical functional element. In addition, an illumination unit comprising a radiation source 22, an optical element 23, and a fixture or a housing 32 is integrated on the micromechanical substrate at a position adjacent to the microelectronic substrate 27 and the second spacer substrate 31. Moreover, an optical element 24 for coupling in radiation 35, which was emitted by the radiation source 22 (indicated at reference numeral 34) and has started to interact with an object 33, may be integrated.

The spectrometer exhibits a slit diaphragm 1 which is integrated in the micromechanical substrate 43 and by which the electromagnetic radiation is filtered, it being possible for the radiation to be filtered, for example, within the image plane, within an aperture plane, within a plane which is conjugate to same, or between said planes. In this context, the radiation is locally and/or spatially filtered with regard to an object plane. The electromagnetic radiation is collimated via a concave mirror 2 patterned into the optical substrate 25 (indicated at reference numeral 36), and it is spectrally split by a dispersive element 8 such as a diffraction grating or a photonic crystal, for example. The dispersive element 8 is integrated into the surface of a micromechanical scanner mirror 4, which scanner mirror 4 is patterned into the micromechanical substrate 43. The radiation 38 which is spectrally split in various orders of diffraction is re-focused on an exit slit 15, which is integrated into the micromechanical substrate 43, via a further concave mirror 13 integrated into the optical substrate 25. Behind said exit slit 15, a detector 16 is located which may be part of the microelectronic substrate 27 both as a separately arranged or as an integrated photodetector (or which may be arranged on the microelectronic substrate 27). Said detector 16 detects the radiation transmitted by the diaphragm 15.

By means of a rotation 10 of the scanner mirror 4 and, thus, by means of the rotation of the dispersive element 8, the spectral portion of the electromagnetic radiation which is transmitted through the exit slit 15 and may thus be detected by the detector 16 is tuned. The detector signals may be processed in an analog and/or digital manner by electronics generated, or formed, on a silicon wafer, for example by CMOS technology. Optionally, part of the electronics or the entire electronics may be integrated as a circuit into the microelectronic substrate 27 for evaluating the spectra, such as by multivariate data analysis.

The elements produced by the same technology are patterned in or on the same substrate in each case. For example, the concave mirrors 2, 13 are integrated in or on an optical substrate 25, such as in or on a borofloat glass wafer ("float glass": flat glass manufactured by a "float glass process"), a quartz glass wafer, a borosilicate glass wafer, a silicon wafer, or an SOI wafer, the slit diaphragms 1, 15, the scanner mirror 4, and the dispersive element 8 which may be a grating, for example, are integrated in or on a micromechanical substrate 43, such as in or on an SOI wafer or a silicon wafer, the electronic circuits, the detector(s) 16, the drive electronics for the scanner mirror 4, and the position detection unit 18 comprising evaluation electronics for the scanner mirror 4 are integrated in or on a microelectronic substrate 27.

The position detection unit 18 for detecting the deflection state of the micromechanical element 4 may be arranged, for example in the area of the rear side of the micromechanical functional element 4, in or on the microelectronic substrate 27, and it may be configured to detect the deflection state of the micromechanical element 4 by an optical method which evaluates the reflection of radiation by the rear side of the micromechanical element 4.

For a high level of reflectivity of the optically utilized surface areas, such as those of the concave mirrors or diffraction gratings, the surfaces of the substrates are partly or fully coated with aluminum or gold, for example. Optionally, surface areas which are unused optically may be coated with absorbent layers, such as PSK 2000, in order to reduce scattered light and extraneous light. The spacer substrates 30, 31 may be manufactured both by lithographic technology, such as be patterned in or on a silicon wafer or an SOI wafer, or they may be produced by means of a classical production method such as plastic injection molding, hot-stamping, milling or drilling. In order to minimize scattered light and extraneous light, the spacer substrates 30, 31 may also be provided with an absorbent coating.

The individual substrates are adjusted by using adjusting marks, for example. Alternatively, patterned stops, alignment structures or patterned, diffractive optical elements may be used on the substrates, for example. The individual substrates are glued to one another or interconnected by anodic bonding (connection method for connecting, for example, silicon substrates to glass substrates), for example at the areas of contact. The adhering surfaces may be configured such that the individual modules are closely encapsulated in each case. Electric contacting is enabled by a corresponding technology, such as so-called flip-chip bonding, for example (connection method in which chips, for example, are connected, with their contacting sides down, to another substrate or another component), so-called wire bonding (connection method in which various components, for example, are electrically connected to one another) with potential openings, or adhering using electrically conductive adhesive. Dicing of the spectrometer modules may be performed using a wafer saw, for example. After encapsulation and/or assembly into a housing, production of the spectrometer modules is completed.

Figure 3:
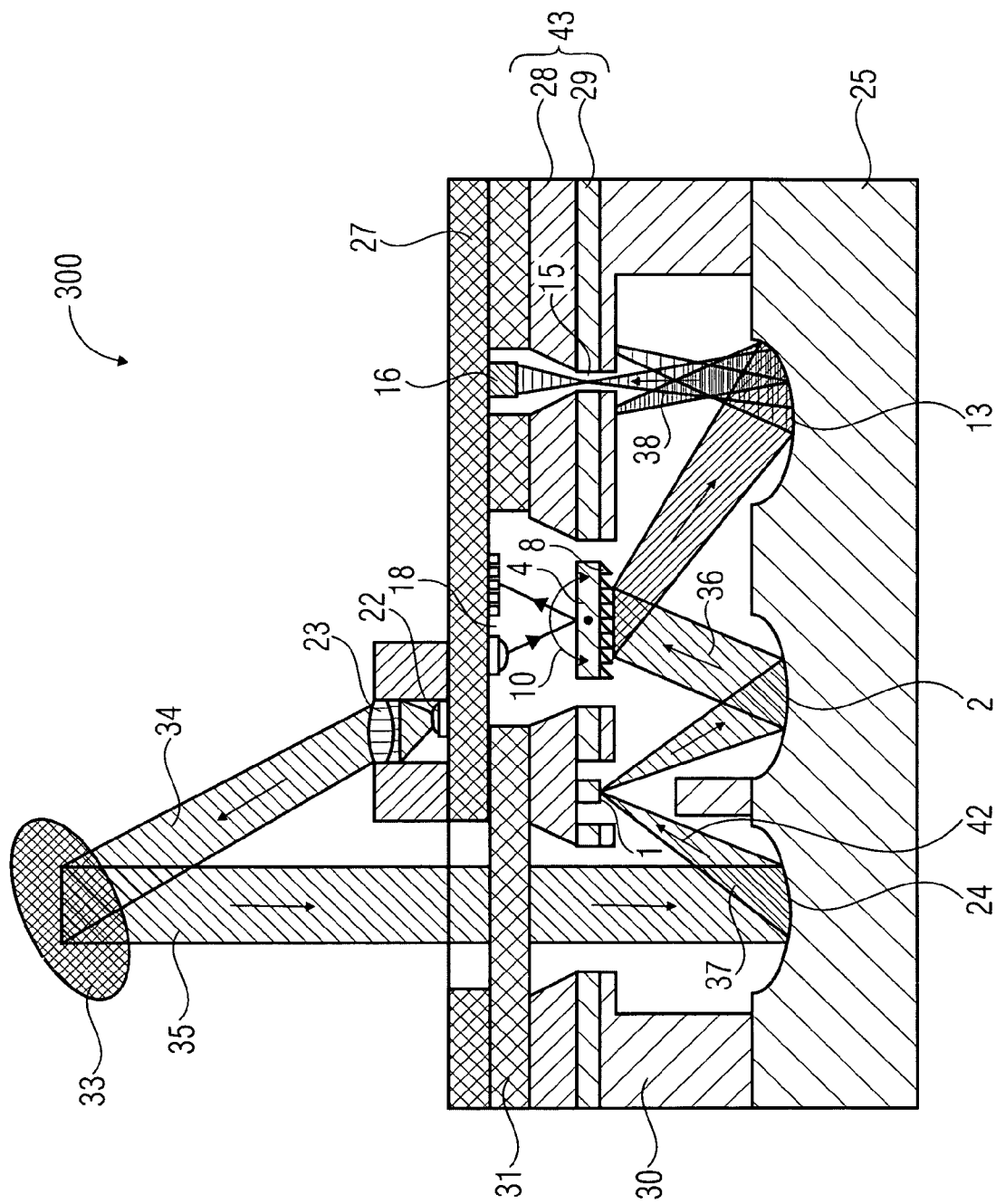
FIG. 3 is a fundamental outline, in the form of a cross-sectional representation, of an integrated MOEMS spectrometer in accordance with the Czerny-Turner principle which comprises integrated, reflective input coupling and a separate illumination unit.

FIG. 3 shows a fundamental outline, in the form of a cross-sectional representation, of an integrated MOEMS spectrometer in accordance with the Czerny-Turner principle which comprises integrated reflective input coupling and an external illumination unit in accordance with an embodiment of the invention. The spectrometer is designated by 200 in its entirety. The system comprises, in a successively stacked manner, an optical substrate 25, a first spacer substrate 30, a micromechanical substrate 43, a second spacer substrate 31, and a microelectronic substrate 27. The micromechanical substrate 43 may be an SOI wafer 28+29 (silicon-on-isolator wafer), for example, wherein 28 designates the handle layer of the SOI wafer, and 29 designates that layer of the SOI wafer within which a movable micromechanical functional element may be patterned. At the position where a movable micromechanical functional element is located, the handle layer is removed so as to enable unimpeded movement of the micromechanical functional element.

In this embodiment, the above-described spectrometer module 200 is supplemented by an optical element for re-focusing 24 the radiation 35 coming from an object 33, such as a concave mirror, which is integrated into the optical substrate 25, and the illumination unit is arranged externally. To couple radiation into the module, e.g. an opening is patterned into the micromechanical substrate 43. In this embodiment, the second spacer substrate 31, which is arranged between the micromechanical substrate 43 and the microelectronic substrate 27, may be used for closely encapsulating the spectrometer module 300 from the environment. In parts, this spacer substrate 31 is further provided with openings to ensure unimpeded propagation of the electromagnetic radiation. In other places, this spacer substrate 31 is provided with absorbent or reflective layers so as to minimize scattered light and extraneous light. Moreover, a bar 1 is integrated into the micromechanical substrate 43, said bar being designed as a reflective element so as to serve as an entrance slit for locally and/or spatially filtering the electromagnetic radiation 37 coupled in. Said bar may be provided with a reflective coating.

The elements produced by the same technology are patterned in or on the same substrate in each case. For example, the concave mirrors 2, 13 and the optical element for refocusing 24 are integrated in or on an optical substrate 25, such as in or on a borofloat glass wafer ("float glass": flat glass manufactured by a "float glass process"), a quartz glass wafer, a borosilicate glass wafer, a silicon wafer, or an SOI wafer, the slit diaphragms 1, 15, the scanner mirror 4, and the dispersive element 8 which may be a grating, for example, are integrated in or on a micromechanical substrate 43, such as in or on an SOI wafer or a silicon wafer, the electronic circuits, the detector(s) 16, the drive electronics for the scanner mirror 4, and the position detection unit 18 comprising evaluation electronics for the scanner mirror 4 are integrated in or on a microelectronic substrate 27.

The position detection unit 18 for detecting the deflection state of the micromechanical element 4 may be arranged, for example in the area of the rear side of the micromechanical functional element 4, in or on the microelectronic substrate 27, and it may be configured to detect the deflection state of the micromechanical element 4 by an optical method which evaluates the reflection of radiation by the rear side of the micromechanical element 4.

For a high level of reflectivity of the optically utilized surface areas, such as those of the concave mirrors or diffraction gratings, the surfaces of the substrates are partly or fully coated with aluminum or gold, for example. Optionally, surface areas which are unused optically may be coated with absorbent layers, such as PSK 2000, in order to reduce scattered light and extraneous light. The spacer substrates 30, 31 may be manufactured both by lithographic technology, such as be patterned in or on a silicon wafer or an SOI wafer, or they may be produced by means of a classical production method such as plastic injection molding, hot-stamping, milling or drilling. In order to minimize scattered light and extraneous light, the spacer substrates 30, 31 may also be provided with an absorbent coating.

The individual substrates are adjusted by using adjusting marks, for example. Alternatively, patterned stops, alignment structures or patterned, diffractive optical elements may be used on the substrates, for example. The individual substrates are glued to one another or interconnected by anodic bonding (connection method for connecting, for example, silicon substrates to glass substrates), for example at the areas of contact. The adhering surfaces may be configured such that the individual modules are closely encapsulated in each case. Electric contacting is enabled by a corresponding technology, such as so-called flip-chip bonding, for example (connection method in which chips, for example, are connected, with their contacting sides down, to another substrate or another component), so-called wire bonding (connection method in which various components, for example, are electrically connected to one another) with potential openings, or adhering using electrically conductive adhesive. Dicing of the spectrometer modules may be performed using a wafer saw, for example. After encapsulation and/or assembly into a housing, production of the spectrometer modules is completed.

Figure 4:
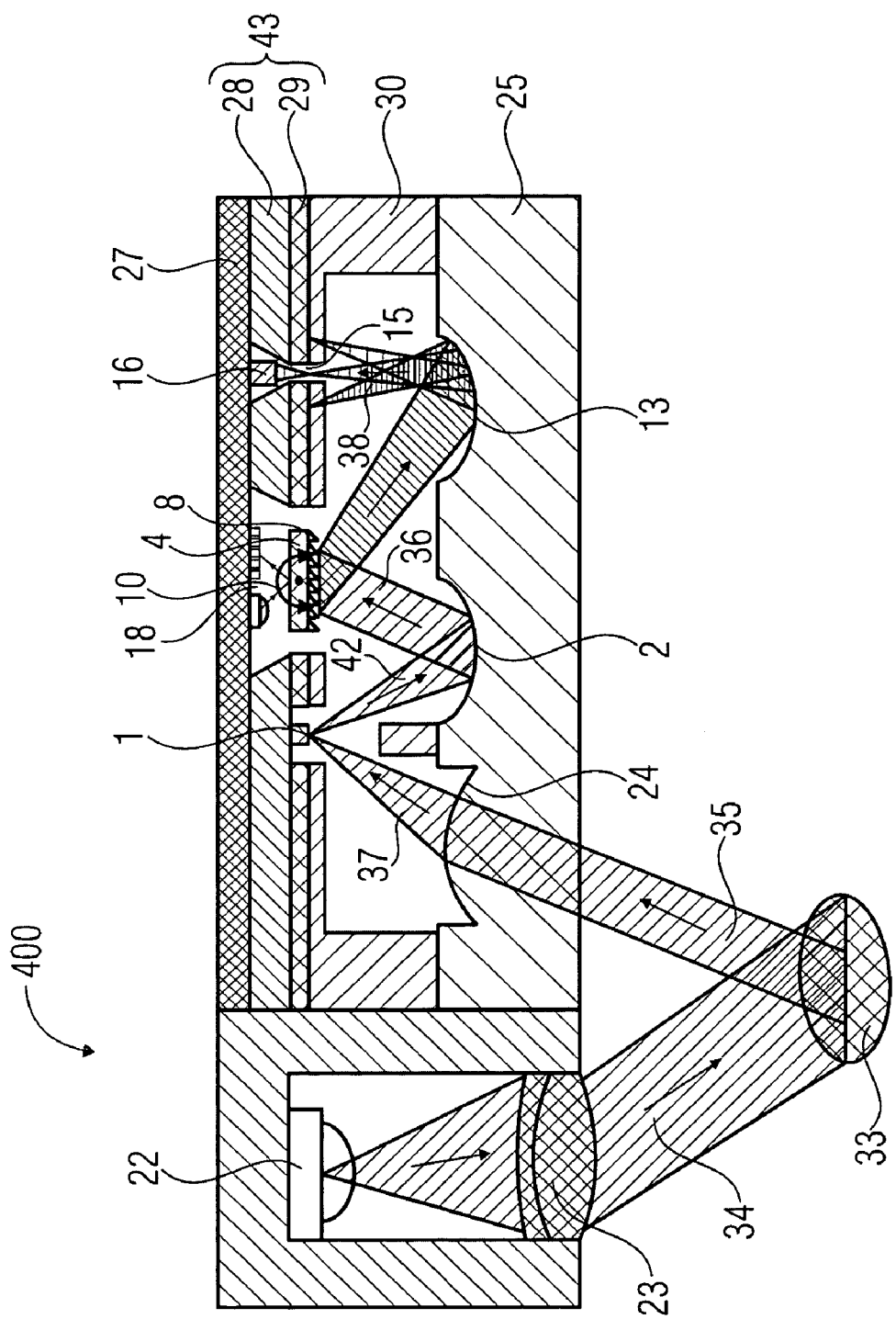
FIG. 4 is a fundamental outline, in the form of a cross-sectional representation, of an integrated MOEMS spectrometer in accordance with the Czerny-Turner principle which comprises integrated reflective input coupling and a separate illumination unit.

FIG. 4 shows a fundamental outline, in the form of a cross-sectional representation, of an integrated MOEMS spectrometer in accordance with the Czerny-Turner principle which comprises integrated reflective input coupling and an external illumination unit in accordance with an embodiment of the invention. The spectrometer is designated by 400 in its entirety. The system comprises, in a successively stacked manner, an optical substrate 25, a first spacer substrate 30, a micromechanical substrate 43, and a microelectronic substrate 27. The micromechanical substrate 43 may be an SOI wafer 28+29 (silicon-on-isolator wafer), for example, wherein 28 designates the handle layer of the SOI wafer, and 29 designates that layer of the SOI wafer within which a movable micromechanical functional element may be patterned. At the position where a movable micromechanical functional element is located, the handle layer is removed so as to enable unimpeded movement of the micromechanical functional element.

In this embodiment, the above-described spectrometer module 200 is supplemented by an optical element for refocusing 24 the radiation 35 coming from an object 33, such as a refractive lens, which is integrated into the optical substrate 25, and the illumination unit is arranged externally. The radiation 35 is coupled in via that side of the optical substrate 25 which faces away from the micromechanical substrate 43, for example via refractive optics. Moreover, a bar 1 is integrated into the micromechanical substrate 43, said bar being designed as a reflective element so as to serve as an entrance slit for locally and/or spatially filtering the electromagnetic radiation 37 coupled in. Said bar may be provided with a reflective coating.

The elements produced by the same technology are patterned in or on the same substrate in each case. For example, the concave mirrors 2, 13 and the optical element for refocusing 24 are integrated in or on an optical substrate 25, such as in or on a borofloat glass wafer ("float glass": flat glass manufactured by a "float glass process"), a quartz glass wafer, a borosilicate glass wafer, a silicon wafer, or an SOI wafer, the slit diaphragms 1, 15, the scanner mirror 4, and the dispersive element 8 which may be a grating, for example, are integrated in or on a micromechanical substrate 43, such as in or on an SOI wafer or a silicon wafer, the electronic circuits, the detector(s) 16, the drive electronics for the scanner mirror 4, and the position detection unit 18 comprising evaluation electronics for the scanner mirror 4 are integrated in or on a microelectronic substrate 27.

The position detection unit 18 for detecting the deflection state of the micromechanical element 4 may be arranged, for example in the area of the rear side of the micromechanical functional element 4, in or on the microelectronic substrate 27, and it may be configured to detect the deflection state of the micromechanical element 4 by an optical method which evaluates the reflection of radiation by the rear side of the micromechanical element 4.

For a high level of reflectivity of the optically utilized surface areas, such as those of the concave mirrors or diffraction gratings, the surfaces of the substrates are partly or fully coated with aluminum or gold, for example. Optionally, surface areas which are unused optically may be coated with absorbent layers, such as PSK 2000, in order to reduce scattered light and extraneous light. The spacer substrate 30 may be patterned both by lithographic technology, such as in or on a silicon wafer or an SOI wafer, or it may be produced by means of a classical production method such as plastic injection molding, hot-stamping, milling or drilling. In order to minimize scattered light and extraneous light, the spacer substrate 30 may also be provided with an absorbent coating.

The individual substrates are adjusted by using adjusting marks, for example. Alternatively, patterned stops, alignment structures or patterned, diffractive optical elements may be used on the substrates, for example. The individual substrates are glued to one another or interconnected by anodic bonding (connection method for connecting, for example, silicon substrates to glass substrates), for example at the areas of contact. The adhering surfaces may be configured such that the individual modules are closely encapsulated in each case. Electric contacting is enabled by a corresponding technology, such as so-called flip-chip bonding, for example (connection method in which chips, for example, are connected, with their contacting sides down, to another substrate or another component), so-called wire bonding (connection method in which various components, for example, are electrically connected to one another) with potential openings, or adhering using electrically conductive adhesive. Dicing of the spectrometer modules may be performed using a wafer saw, for example. After encapsulation and/or assembly into a housing, production of the spectrometer modules is completed.

Figure 5A:
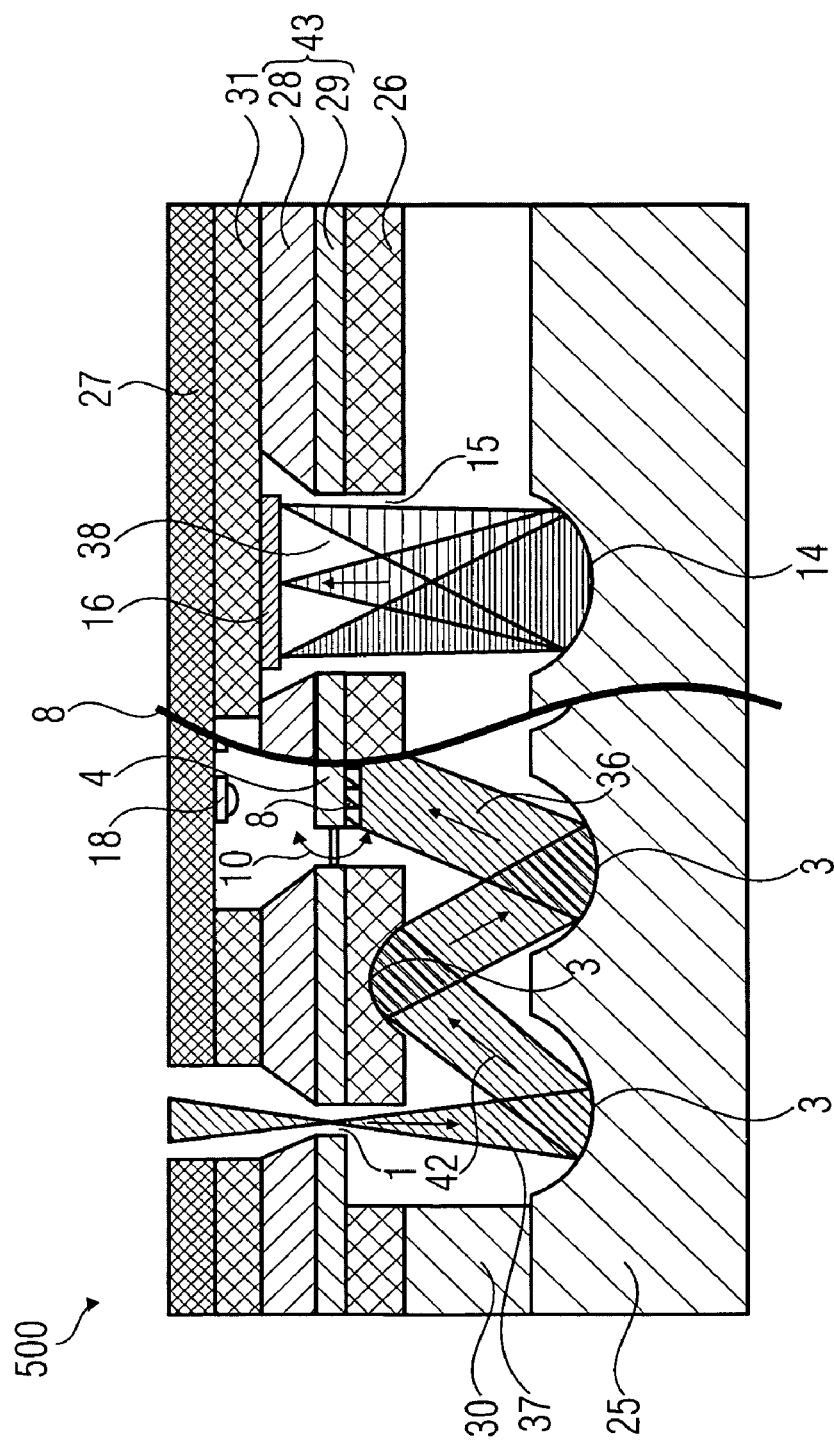
FIG. 5A is a fundamental outline, in the form of a cross-sectional representation, of an integrated spatially resolving MOEMS spectrometer which comprises an MEMS (micro-electromechanical system) scanner mirror (movable mirror for sampling an area, for example) including an integrated diffraction grating.
Figure 5B:
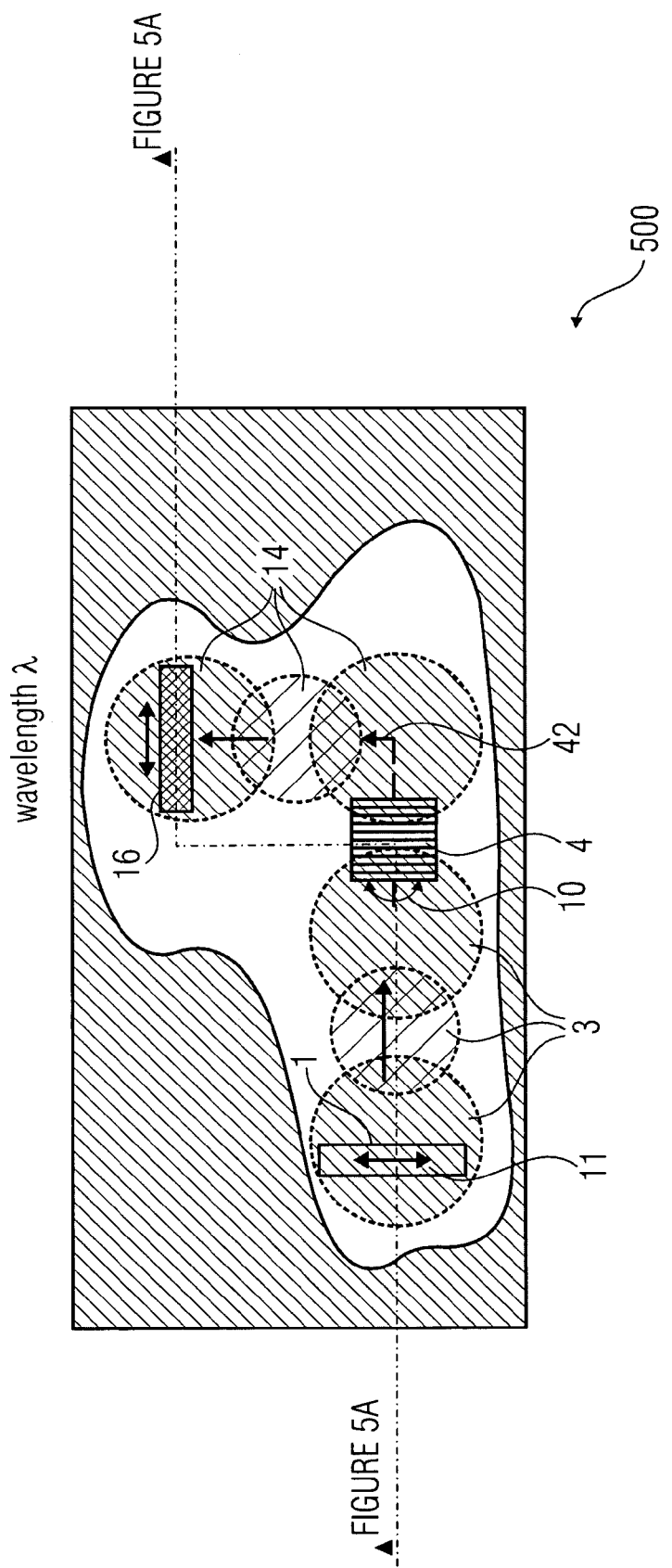
FIG. 5B is a fundamental outline, in the form of a cross-sectional representation, of an integrated spatially resolving MOEMS spectrometer which comprises a MEMS scanner mirror including an integrated diffraction grating.

FIGS. 5A and 5B are fundamental outlines, in the form of cross-sectional representations, of an integrated spatially resolving MOEMS spectrometer which comprises an MEMS (micro-electromechanical system) scanner mirror (movable mirror for sampling an area, for example) including an integrated diffraction grating in accordance with an embodiment of the invention. With regard to some details of the embodiment, please refer to DE 102006019840 A1 for a line scan camera for spectral image detection. The spectrometer is designated by 500 in its entirety. The system comprises, in a successively stacked manner, an optical substrate 25, a first spacer substrate 30, a second optical substrate 26, a micromechanical substrate 43, a second spacer substrate 31, and a microelectronic substrate 27. The micromechanical substrate 43 may be an SOI wafer 28+29 (silicon-on-isolator wafer), for example, wherein 28 designates the handle layer of the SOI wafer, and 29 designates that layer of the SOI wafer within which a movable micromechanical functional element may be patterned. At the position where a movable micromechanical functional element is located, the handle layer is removed so as to enable unimpeded movement of the micromechanical functional element.

Due to this design and this technology, it is also possible to realize multi- or hyper-spectral imaging systems in addition to realizing spatially resolving spectrometers, such as that shown in FIGS. 5A and 5B. For realizing a corresponding imaging quality across an extensive image field, the system consists of a first optical substrate 25 and a second optical substrate 26. However, it may also be realized with only one of the two substrates. In an embodiment comprising two optical substrates, the system consists of a slit diaphragm 1 which acts as a field diaphragm and is integrated into the micromechanical substrate 43 or into the first optical substrate 25. By at least one imaging optical element 3, such as a concave mirror or a convex mirror, which is integrated into the first optical substrate 25 or into the second optical substrate 26, the electromagnetic radiation 37 passing through the diaphragm 1 is collimated (as is indicated at reference numeral 36). By a dispersive element 8, such as a diffraction grating, a photonic crystal or a diffractive optical element, which is integrated into the surface of a micromechanical scanner mirror 4, the radiation is spectrally split 38, both elements being patterned into the micromechanical substrate 43. The radiation 38 which is spectrally split into various orders of diffraction is re-focused, via at least one further imaging optical element 14 integrated into the first optical substrate 25 or into the second optical substrate 26, on an exit slit 15 integrated into the micromechanical substrate 43 or into the second optical substrate 26. Said exit slit 15 has a detector 16 located behind it which may be arranged separately or be integrated into the microelectronic substrate 27. The detector detects the radiation transmitted by the diaphragm 15.

By the dispersive element 8, the spectrally split electromagnetic radiation 38 of a dot/image point (pixel)/area is detected in parallel. By rotating 10 the scanner mirror 4 with the dispersive element 8, the entrance slit 1 is sequentially 11 detected, dot-by-dot, in a spectrally resolved manner.

Subsequently, the detector signals may be processed in an analog and/or digital manner by electronics generated or formed on a silicon wafer, for example by means of CMOS technology. Optionally, part of the electronics or the entire electronics may be integrated as a circuit into the microelectronic substrate 27, for example for correcting the spectrally resolved image and/or for evaluating the spectra, such as by multivariate data analysis.

The elements produced by the same technology are patterned in or on the same substrate in each case, if possible. For example, the imaging optical elements 3, 14, such as concave mirrors or convex mirrors, are integrated in or on the first optical substrate 25 or the second optical substrate 26, such as in or on a borofloat glass wafer ("float glass": flat glass manufactured by a "float glass process"), a quartz glass wafer, a borosilicate glass wafer, a silicon wafer, or an SOI wafer, the slit diaphragms 1, 15, the scanner mirror 4, and the dispersive element 8 which may be a grating, for example, are integrated in or on a micromechanical substrate 43, such as in or on an SOI wafer or a silicon wafer, the electronic circuits, the detector(s) 16, the drive electronics for the scanner mirror 4, and the position detectors 18 comprising evaluation electronics for the scanner mirror 4 are integrated in or on a microelectronic substrate 27.

The position detection unit 18 for detecting the deflection state of the micromechanical element 4 may be arranged, for example in the area of the rear side of the micromechanical functional element 4, in or on the microelectronic substrate 27, and it may be configured to detect the deflection state of the micromechanical element 4 by an optical method which evaluates the reflection of radiation by the rear side of the micromechanical element 4.

For a high level of reflectivity of the optically utilized surface areas, such as those of the concave mirrors or diffraction gratings, the surfaces of the substrates are partly or fully coated with aluminum or gold, for example. Optionally, surface areas which are unused optically may be coated with absorbent layers, such as PSK 2000, in order to reduce scattered light and extraneous light. The spacer substrates 30, 31 may be patterned both by lithographic technology, such as in or on a silicon wafer or an SOI wafer, or they may be produced by means of a classical production method such as plastic injection molding, hot-stamping, milling or drilling. In order to minimize scattered light and extraneous light, the spacer substrates 30, 31 may also be provided with an absorbent coating.

The individual substrates are adjusted by using adjusting marks, for example. Alternatively, patterned stops, alignment structures or patterned, diffractive optical elements may be used on the substrates, for example. The individual substrates are glued to one another or interconnected by anodic bonding (connection method for connecting, for example, silicon substrates to glass substrates), for example at the areas of contact. The adhering surfaces may be configured such that the individual modules are closely encapsulated in each case. Electric contacting is enabled by a corresponding technology, such as so-called flip-chip bonding, for example (connection method in which chips, for example, are connected, with their contacting sides down, to another substrate or another component), so-called wire bonding (connection method in which various components, for example, are electrically connected to one another) with potential openings, or adhering using electrically conductive adhesive. Dicing of the spectrometer modules may be performed using a wafer saw, for example. After encapsulation and/or assembly into a housing, production of the spectrometer modules is completed.

Figure 6A:
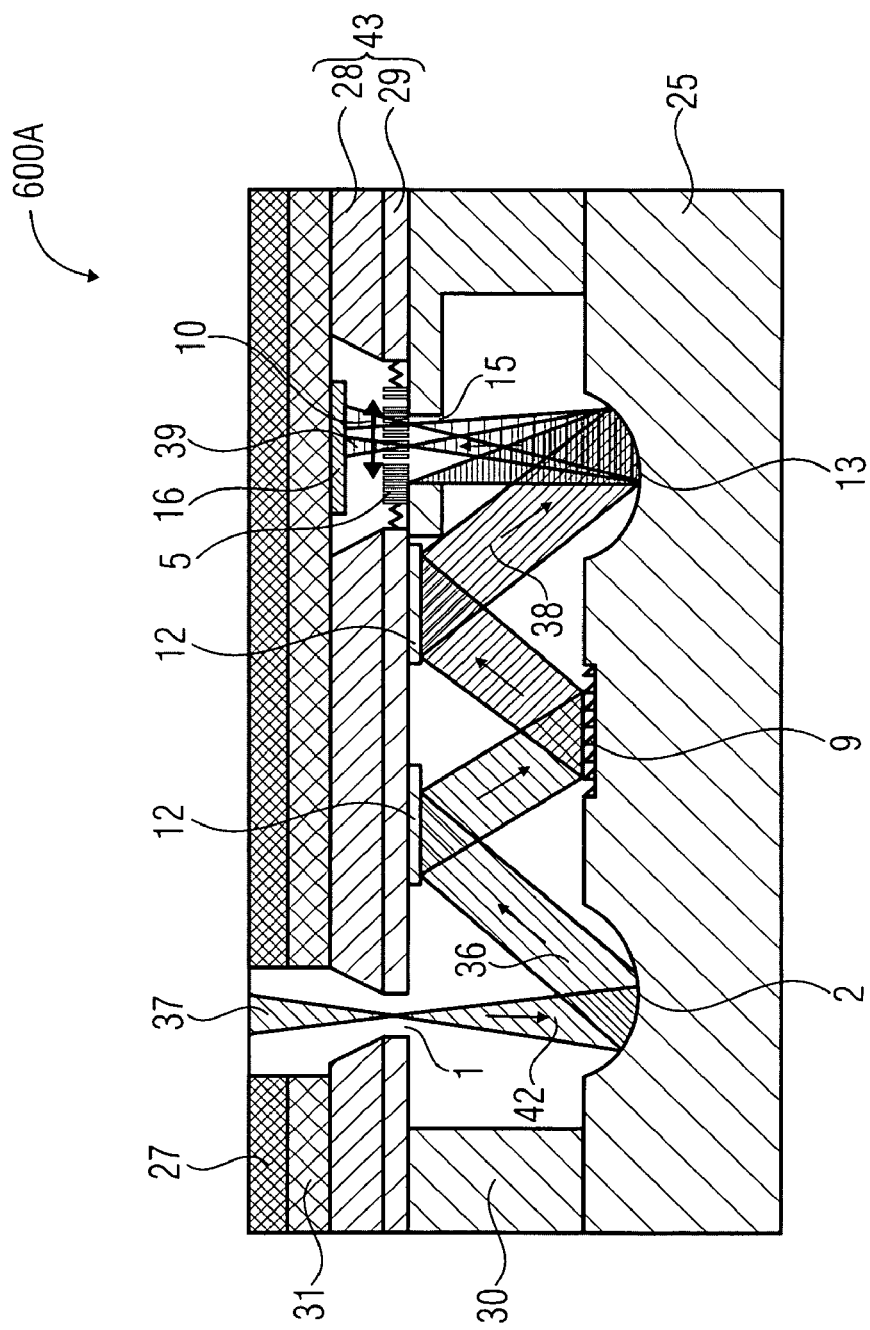
FIG. 6A is a fundamental outline, in the form of a cross-sectional representation, of an integrated Hadamard transformation spectrometer comprising a micromechanical modulator at the exit diaphragm, and comprising an integrated dispersive element arranged in or on the optical substrate.
Figure 6B:
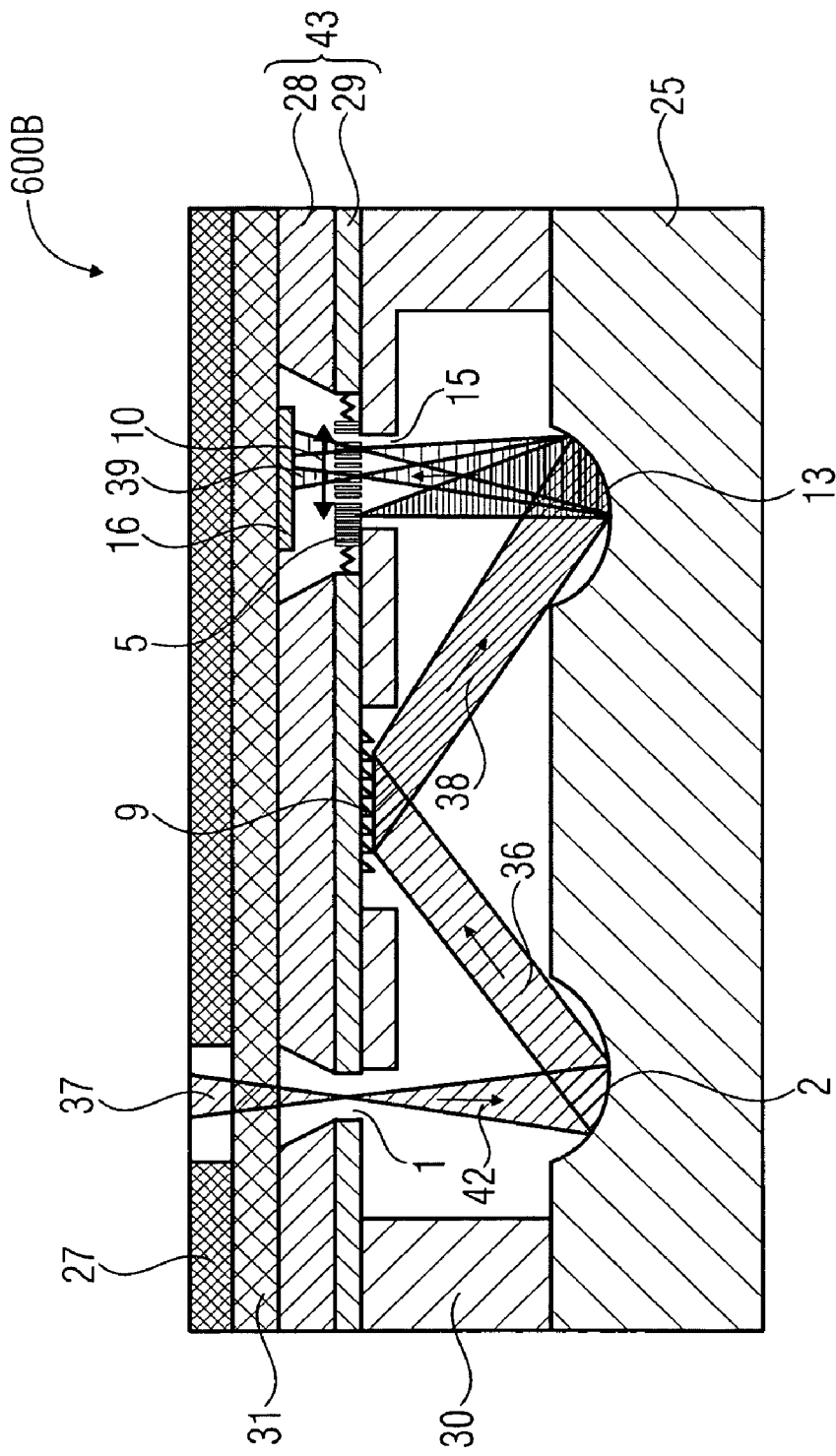
FIG. 6B is a fundamental outline, in the form of a cross-sectional representation, of an integrated Hadamard transformation spectrometer comprising a micromechanical modulator at the exit diaphragm, and comprising an integrated dispersive element arranged in or on the micromechanical substrate.
Figure 7:
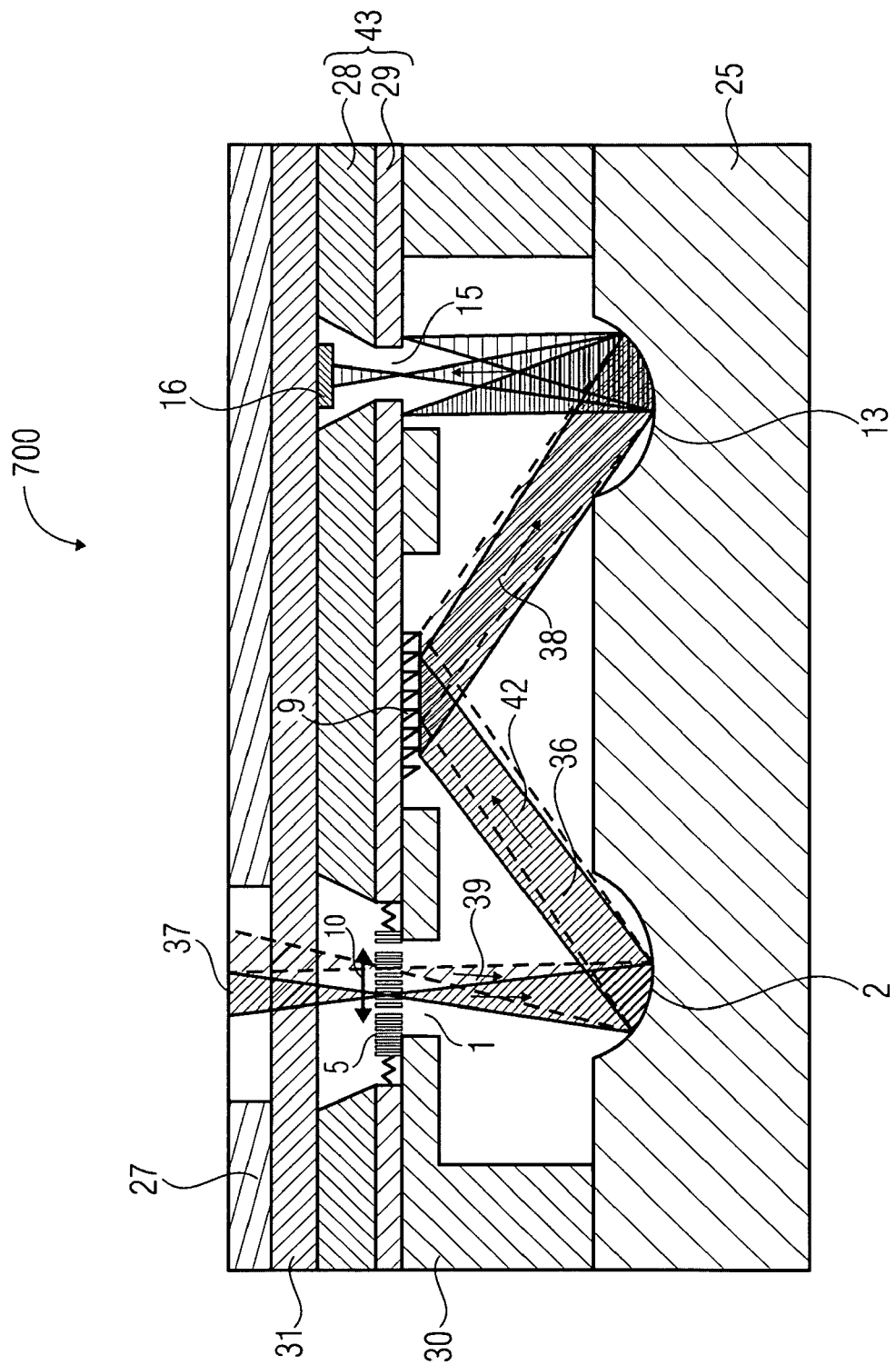
FIG. 7 is a fundamental outline, in the form of a cross-sectional representation, of an integrated Hadamard transformation spectrometer comprising a micromechanical modulator at the entrance diaphragm, and comprising an integrated dispersive element.

FIGS. 6A, 6B and 7 show fundamental outlines of cross-sectional representations of various embodiments of an integrated Hadamard transformation spectrometer comprising a micromechanical modulator in accordance with an embodiment of the invention. The various embodiments of the spectrometer are designated by 600a, 600b and 700 in their entireties. All three embodiments of the spectrometer comprise, in a successively stacked manner, an optical substrate 25, a first spacer substrate 30, a micromechanical substrate 43, a second spacer substrate 31, and a microelectronic substrate 27. The various embodiments essentially differ in the arrangement of the micromechanical modulator 5 at the entrance slit, as is shown in the embodiment 700, or at the exit slit, as is shown in the embodiments 600a, 600b, and in the arrangement of the dispersive element 9, which may be located in or on the optical substrate 25, as is shown in the embodiment 600a, or in or on the micromechanical substrate 43, as is shown in the embodiments 600b, 700. The micromechanical substrate 43 may be an SOI wafer 28+29 (silicon-on-isolator wafer), for example, wherein 28 designates the handle layer of the SOI wafer, and 29 designates that layer of the SOI wafer within which a movable micromechanical functional element may be patterned. At the position where a movable micromechanical functional element is located, the handle layer is removed so as to enable unimpeded movement of the micromechanical functional element.

In the embodiments 600a and 600b, the electromagnetic radiation 37 is locally and/or spatially filtered by a slit diaphragm 1 integrated into the micromechanical substrate 43. The electromagnetic radiation is collimated via a concave mirror 2 integrated into the optical substrate 25 (indicated at reference numeral 36), and it is spectrally split by a dispersive element 9 such as a diffraction grating, for example, which may be integrated both into the micromechanical substrate 43, as is shown in the embodiment 600b, and into the optical substrate 25, as is shown in the embodiment 600a (as is indicated at reference numeral 38). Said electromagnetic radiation is re-focused, via a further concave mirror 13 integrated into the optical substrate 25, on a micromechanical modulator 5 integrated into the micromechanical substrate 43. Said modulator 5 may be configured, for example, as a patterned membrane which is moved by an actuator within the plane of the micromechanical substrate 43. The absorbent or reflective membrane is patterned with transparent openings, as a result of which only a specific portion of the spectrally split electromagnetic radiation 38 is transmitted in each case. The distribution of the openings may in some embodiments advantageously correspond to a cyclic matrix, such as to a Hadamard or simplex matrix. By a movement 10 of this membrane and by a temporally sequential detection of the transmitted electromagnetic radiation 39 by a detector 16 which is discretely integrated behind the membrane or is integrated into the microelectronic substrate, a convolution of the transformation matrix with the spectrum results.

Subsequently, the detector signals may be processed in an analog and/or digital manner by electronics generated or formed on a silicon wafer, for example by means of CMOS technology. Optionally, part of the electronics or the entire electronics may be integrated as a circuit into the microelectronic substrate 27, for inversely transforming the spectrum of the electromagnetic radiation, which corresponds to the deconvolution using the transformation matrix, and for evaluating the spectra, such as by multivariate data analysis.

The embodiment shown in FIG. 7 differs from the embodiments 600a and 600b in that the micromechanical modulator 5 is arranged in or on the micromechanical substrate 43 before the slit diaphragm 1 patterned into the first spacer substrate, as a result of which the electromagnetic radiation is modulated at this point already. A further difference is that the micromechanical substrate comprises an exit diaphragm 15.

The elements produced by the same technology are patterned in or on the same substrate in each case. For example, the concave mirrors 2, 13 and, depending on the implementation, the dispersive element 9 are integrated in or on an optical substrate 25, such as in or on a borofloat glass wafer ("float glass": flat glass manufactured by a "float glass process"), a quartz glass wafer, a borosilicate glass wafer, a silicon wafer, or an SOI wafer, depending on the implementation the slit diaphragms 1, 15, the reflective optical elements 12, the micromechanical modulator 5 and, depending on the implementation, the diffraction grating 9, for example, are integrated in or on a micromechanical substrate 43, such as in or on a silicon wafer or an SOI wafer, the electronic circuits, the detector(s) 16, the drive electronics for the micromechanical modulator 5, and position detectors comprising evaluation electronics for the modulator 5 are integrated in or on a microelectronic substrate 27.

For a high level of reflectivity of the optically utilized surface areas, such as those of the concave mirrors or diffraction gratings, the surfaces of the substrates are partly or fully coated with aluminum or gold, for example. Optionally, surface areas which are unused optically may be coated with absorbent layers, such as PSK 2000, in order to reduce scattered light and extraneous light. The spacer substrates 30, 31 may be patterned both by lithographic technology, such as in or on a silicon wafer or an SOI wafer, or they may be produced by means of a classical production method such as plastic injection molding, hot-stamping, milling or drilling. In order to minimize scattered light and extraneous light, the spacer substrates 30, 31 may also be provided with an absorbent coating.

The individual substrates are adjusted by using adjusting marks, for example. Alternatively, patterned stops, alignment structures or patterned, diffractive optical elements may be used on the substrates, for example. The individual substrates are glued to one another or interconnected by anodic bonding (connection method for connecting, for example, silicon substrates to glass substrates), for example at the areas of contact. The adhering surfaces may be configured such that the individual modules are closely encapsulated in each case. Electric contacting is enabled by a corresponding technology, such as so-called flip-chip bonding, for example (connection method in which chips, for example, are connected, with their contacting sides down, to another substrate or another component), so-called wire bonding (connection method in which various components, for example, are electrically connected to one another) with potential openings, or adhering using electrically conductive adhesive. Dicing of the spectrometer modules may be performed using a wafer saw, for example.

After encapsulation and/or assembly into a housing, production of the spectrometer modules is completed.

Figure 8:
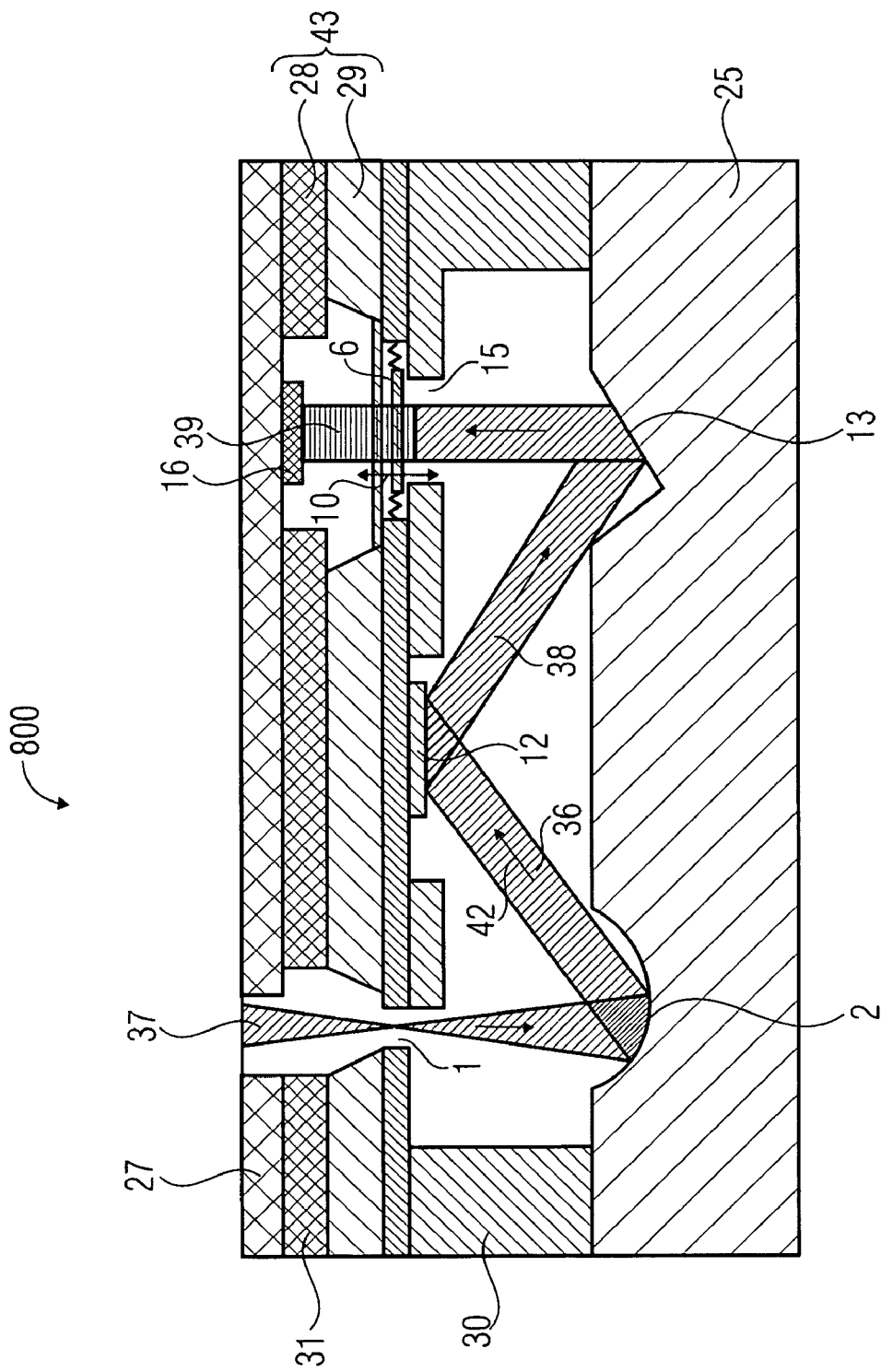
FIG. 8 is a fundamental outline, in the form of a cross-sectional representation, of an integrated spectrometer comprising a spectrally tunable filter configured as a micromechanical Fabry-Perot interferometer.

FIG. 8 a fundamental outline, in the form of a cross-sectional representation, of an integrated spectrometer comprising a spectrally tunable filter configured as a micromechanical Fabry-Perot interferometer in accordance with an embodiment of the invention. The spectrometer is designated by 800 in its entirety. The system comprises, in a successively stacked manner, an optical substrate 25, a first spacer substrate 30, a micromechanical substrate 43, a second spacer substrate 31, and a microelectronic substrate 27. The micromechanical substrate 43 may be an SOI wafer 28+29 (silicon-on-isolator wafer), for example, wherein 28 designates the handle layer of the SOI wafer, and 29 designates that layer of the SOI wafer within which a movable micromechanical functional element may be patterned. At the position where a movable micromechanical functional element is located, the handle layer is removed so as to enable unimpeded movement of the micromechanical functional element.

In this embodiment, the electromagnetic radiation 37 is locally and/or spatially filtered by a slit diaphragm 1 integrated into the micromechanical substrate 43. Via a concave mirror 2 integrated into the optical substrate 25, the electromagnetic radiation 36 is collimated and reflected 38 by an oblique mirror 12, which is configured, for example, as an oblique mirrored surface and may be integrated both into the micromechanical substrate 43, as is shown in FIG. 8, and into the optical substrate 25, depending on the requirements of the application. The spectral composition of the electromagnetic radiation is modulated by an integrated tunable filter 6, the spectral transmission of which is variable. The micromechanical filter 6 is based on a Fabry-Perot interferometer, for example. Said filter (or filter 6) consists of two platelets, at whose surfaces radiation is reflected. At least one of the two platelets may be moved by an integrated micromechanical actuator (as is indicated at reference numeral 10). Depending on the distance between the two platelets, a wavelength-dependent phase delay results for two reflected waves. Depending on the superposition, or on the phase shift, said waves may interfere in a manner ranging from constructive to destructive. Accordingly, radiation of a specific wavelength is reflected or transmitted (as is indicated at reference numeral 39). Thus, the spectral transmission is changed by changing the distance between the two platelets. The tunable filter 6 is integrated into the micromechanical substrate 43.

The detector signals may be processed in an analog and/or digital manner by electronics generated, or formed, on a silicon wafer, for example by CMOS technology. Optionally, part of the electronics or the entire electronics may be integrated as a circuit into the microelectronic substrate 27 for calculating the spectrum of the electromagnetic radiation and for evaluating the spectra, such as by multivariate data analysis.

The elements produced by the same technology are patterned in or on the same substrate in each case. For example, the concave mirrors 2, 13 and the oblique mirror 12 are integrated in or on an optical substrate 25, such as in or on a borofloat glass wafer ("float glass": flat glass manufactured by a "float glass process"), a quartz glass wafer, a borosilicate glass wafer, a silicon wafer, or an SOI wafer, the slit diaphragm 1, the diaphragm 15, and the tunable filter comprising the micromechanical actuator 6 for example, are integrated in or on a micromechanical substrate 43, such as in or on a silicon wafer or an SOI wafer, the electronic circuits, the detector(s) 16, the drive electronics for the micromechanically tunable filter 6, and the position detectors comprising evaluation electronics for the tunable filter 6 are integrated in or on a microelectronic substrate 27. However, the diaphragm 15 may also be arranged in the first spacer substrate 30, as is shown in FIG. 8.

For a high level of reflectivity of the optically utilized surface areas, such as those of the concave mirrors or diffraction gratings, the surfaces of the substrates are partly or fully coated with aluminum or gold, for example. Optionally, surface areas which are unused optically may be coated with absorbent layers, such as PSK 2000, in order to reduce scattered light and extraneous light. The spacer substrates 30, 31 may be patterned both by lithographic technology, such as in or on a silicon wafer or an SOI wafer, or they may be produced by means of a classical production method such as plastic injection molding, hot-stamping, milling or drilling. In order to minimize scattered light and extraneous light, the spacer substrates 30, 31 may also be provided with an absorbent coating.

The individual substrates are adjusted by using adjusting marks, for example. Alternatively, patterned stops, alignment structures or patterned, diffractive optical elements may be used on the substrates, for example. The individual substrates are glued to one another or interconnected by anodic bonding (connection method for connecting, for example, silicon substrates to glass substrates), for example at the areas of contact. The adhering surfaces may be configured such that the individual modules are closely encapsulated in each case. Electric contacting is enabled by a corresponding technology, such as so-called flip-chip bonding, for example (connection method in which chips, for example, are connected, with their contacting sides down, to another substrate or another component), so-called wire bonding (connection method in which various components, for example, are electrically connected to one another) with potential openings, or adhering using electrically conductive adhesive. Dicing of the spectrometer modules may be performed using a wafer saw, for example. After encapsulation and/or assembly into a housing, production of the spectrometer modules is completed.

Figure 9A:
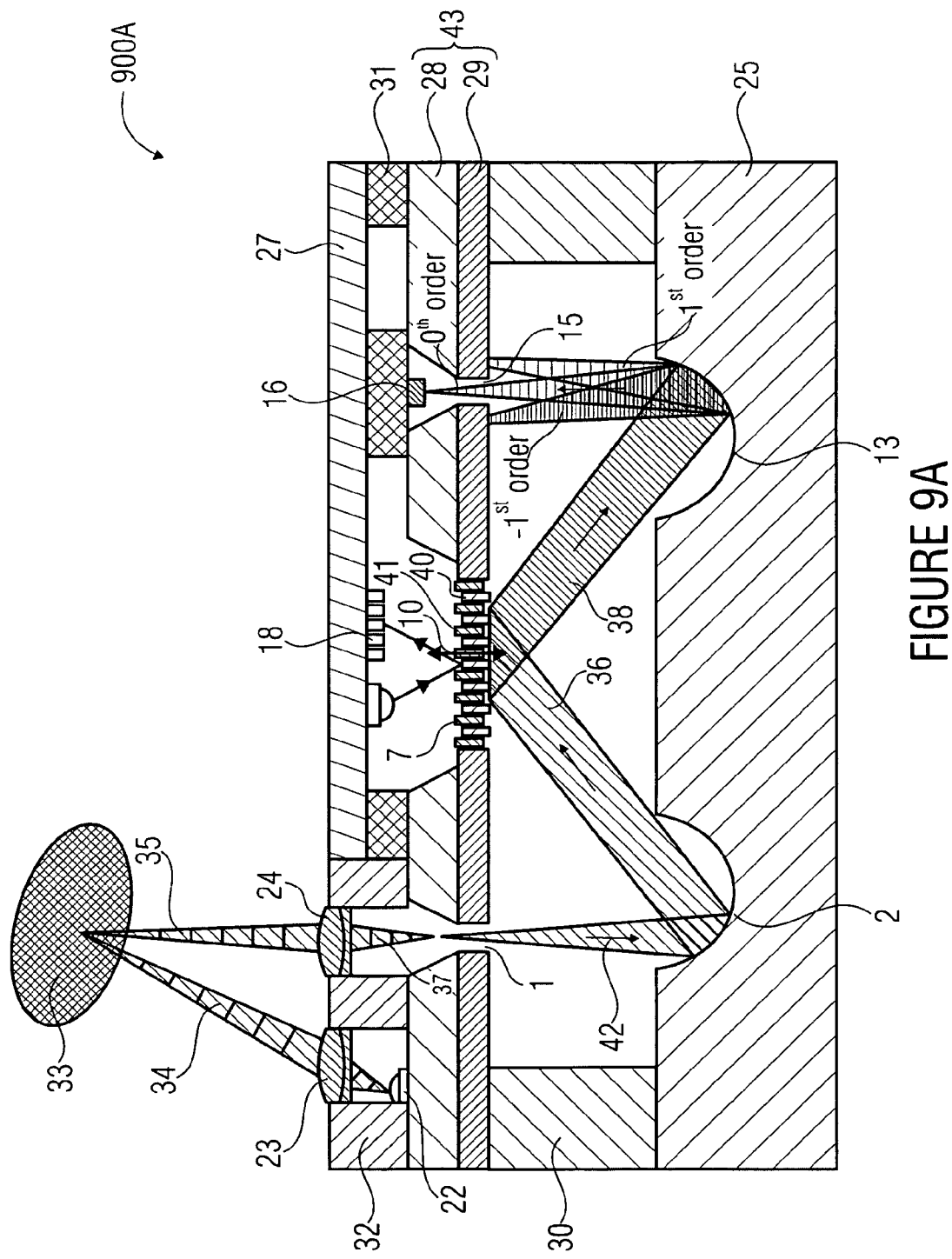
FIG. 9A is a fundamental outline, in the form of a cross-sectional representation, of an integrated transformation spectrometer on the basis of a binary phase grating having variable phase depth.

FIG. 9A shows a fundamental outline, in the form of a cross-sectional representation, of an integrated transformation spectrometer on the basis of a binary phase grating having variable phase depth in accordance with an embodiment of the invention. With regard to some details of the embodiment, please refer to US 2007/0159635 A1. The spectrometer module is designated by 900a in its entirety. The system comprises, in a successively stacked manner, an optical substrate 25, a first spacer substrate 30, a micromechanical substrate 43, a second spacer substrate 31, and a microelectronic substrate 27. The micromechanical substrate 43 may be an SOI wafer 28+29 (silicon-on-isolator wafer), for example, wherein 28 designates the handle layer of the SOI wafer, and 29 designates that layer of the SOI wafer within which a movable micromechanical functional element may be patterned. At the position where a movable micromechanical functional element is located, the handle layer is removed so as to enable unimpeded movement of the micromechanical functional element. In addition, an illumination unit comprising a radiation source 22, an optical element 23, and a fixture or a housing 32 is integrated on the micromechanical substrate at a position adjacent to the microelectronic substrate 27 and the second spacer substrate 31. Moreover, an optical element 24 for coupling in radiation 35, which was emitted by the radiation source 22 (as is indicated at reference numeral 34) and has started to interact with an object 33, may be integrated.

Figure 9B:
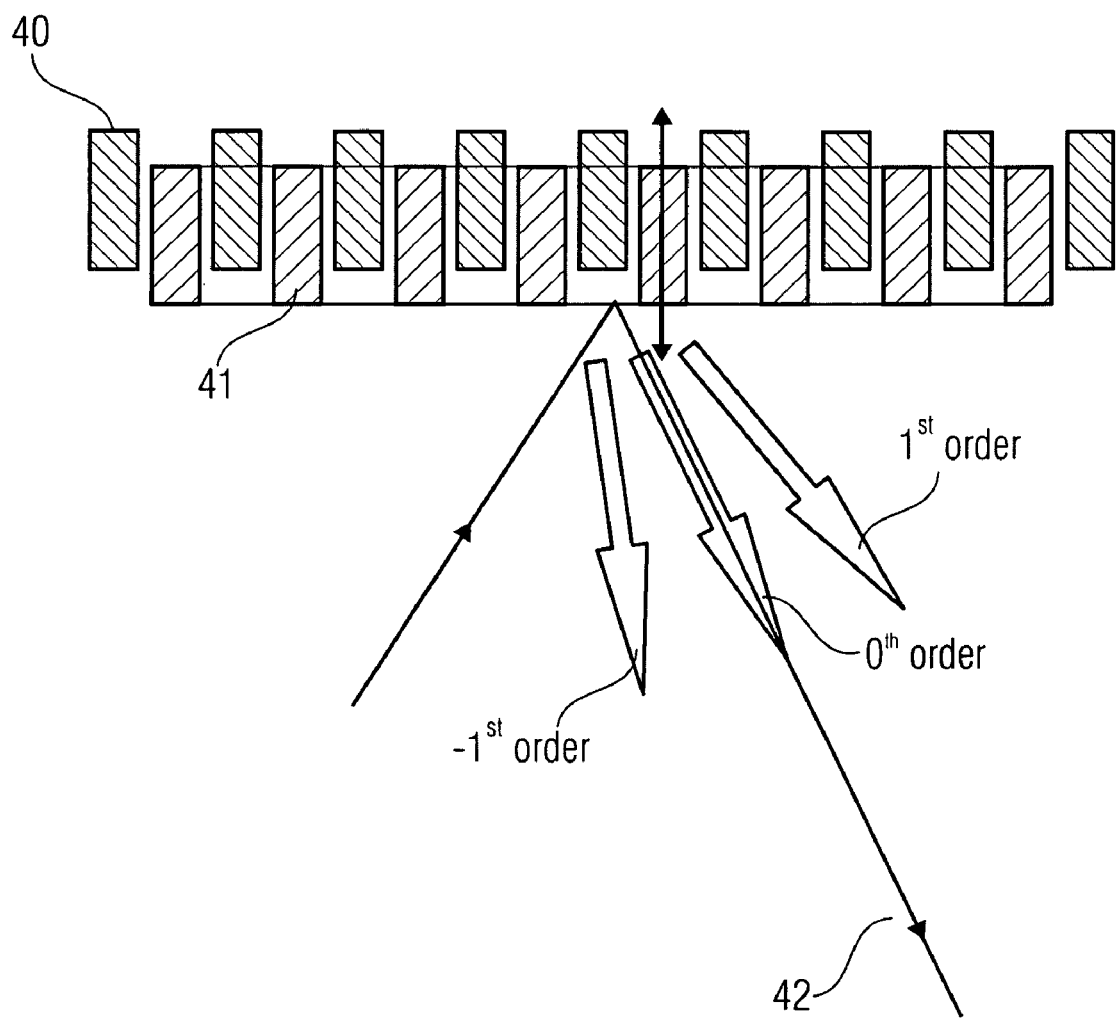
FIG. 9B is a schematic cross-sectional representation of a binary phase grating.

In this embodiment, the electromagnetic radiation 37 is locally and/or spatially filtered by a slit diaphragm 1 integrated into the micromechanical substrate 43. Via a concave mirror 2 patterned into the optical substrate 25, the electromagnetic radiation 36 is collimated and spectrally modulated by a binary grating 7 having variable phase deviation. The portions of the radiation which are reflected by the two lamellae or combs 40, 41, as is shown in FIG. 9B, superimpose one another as a function of the phase difference, which depends on the wavelength of the radiation, in a manner ranging from constructive to destructive. Generally, the spectrally modulated radiation of the $0^{th}$ order of diffraction, as is also shown in FIG. 9B, is utilized. When the distance 10 of both lamellae or combs 40, 41 changes, the spectral composition of the radiation of the $0^{th}$ order of diffraction will also change. The modulatable comb grating 7 is integrated into the micromechanical substrate 43. The modulated electromagnetic radiation 38 is re-focused on an exit diaphragm 15 by a concave mirror 13 integrated into the optical substrate 25. Behind it, a detector 16 is located. It is also possible to employ several detectors for detecting a broader wavelength range. In some embodiments, said detectors may be advantageously integrated into the microelectronic substrate 27 or be arranged as discrete devices.

The detector signals may be processed in an analog and/or digital manner by electronics generated, or formed, on a silicon wafer, for example by CMOS technology. Optionally, part of the electronics or the entire electronics may be integrated as a circuit into the microelectronic substrate 27 for evaluating the spectra, such as by a Fourier transformation for calculating the spectral distribution of the electromagnetic radiation and/or by multivariate data analysis.

The elements produced by the same technology are patterned in or on the same substrate in each case. For example, the concave mirrors 2, 13 are integrated in or on an optical substrate 25, such as a glass substrate made of borofloat glass, a glass substrate made of borosilicate glass, a silicon wafer, or an SOI wafer, the slit diaphragms 1, 15, and the modulatable comb grating comprising the actuator 7 are integrated in or on a micromechanical substrate 43, such as in or on an SOI wafer, the electronic circuits, the detector(s) 16, the drive electronics, and the position detectors 18 comprising evaluation electronics for the modulatable comb grating 7 are integrated in or on a microelectronic substrate 27.

The position detection unit 18 for detecting the deflection state of the micromechanical element 7 may be arranged, for example in the area of the rear side of the micromechanical functional element 7, in or on the microelectronic substrate 27, and it may be configured to detect the deflection state of the micromechanical element 7 by an optical method which evaluates the reflection of radiation by the rear side of the micromechanical element 7.

For a high level of reflectivity of the optically utilized surface areas, such as those of the concave mirrors or diffraction gratings, the surfaces of the substrates are partly or fully coated with aluminum or gold, for example. Optionally, surface areas which are unused optically may be coated with absorbent layers, such as PSK 2000, in order to reduce scattered light and extraneous light. The spacer substrates 30, 31 may be patterned both by lithographic technology, such as in or on a silicon wafer or an SOI wafer, or they may be produced by means of a classical production method such as plastic injection molding, hot-stamping, milling or drilling. In order to minimize scattered light and extraneous light, the spacer substrates 30, 31 may also be provided with an absorbent coating.

The individual substrates are adjusted by using adjusting marks, for example. Alternatively, patterned stops, alignment structures or patterned, diffractive optical elements may be used on the substrates, for example. The individual substrates are glued to one another or interconnected by anodic bonding (connection method for connecting, for example, silicon substrates to glass substrates), for example at the areas of contact. The adhering surfaces may be configured such that the individual modules are closely encapsulated in each case. Electric contacting is enabled by a corresponding technology, such as so-called flip-chip bonding, for example (connection method in which chips, for example, are connected, with their contacting sides down, to another substrate or another component), so-called wire bonding (connection method in which various components, for example, are electrically connected to one another) with potential openings, or adhering using electrically conductive adhesive. Dicing of the spectrometer modules may be performed using a wafer saw, for example. After encapsulation and/or assembly into a housing, production of the spectrometer modules is completed.

Figure 10:
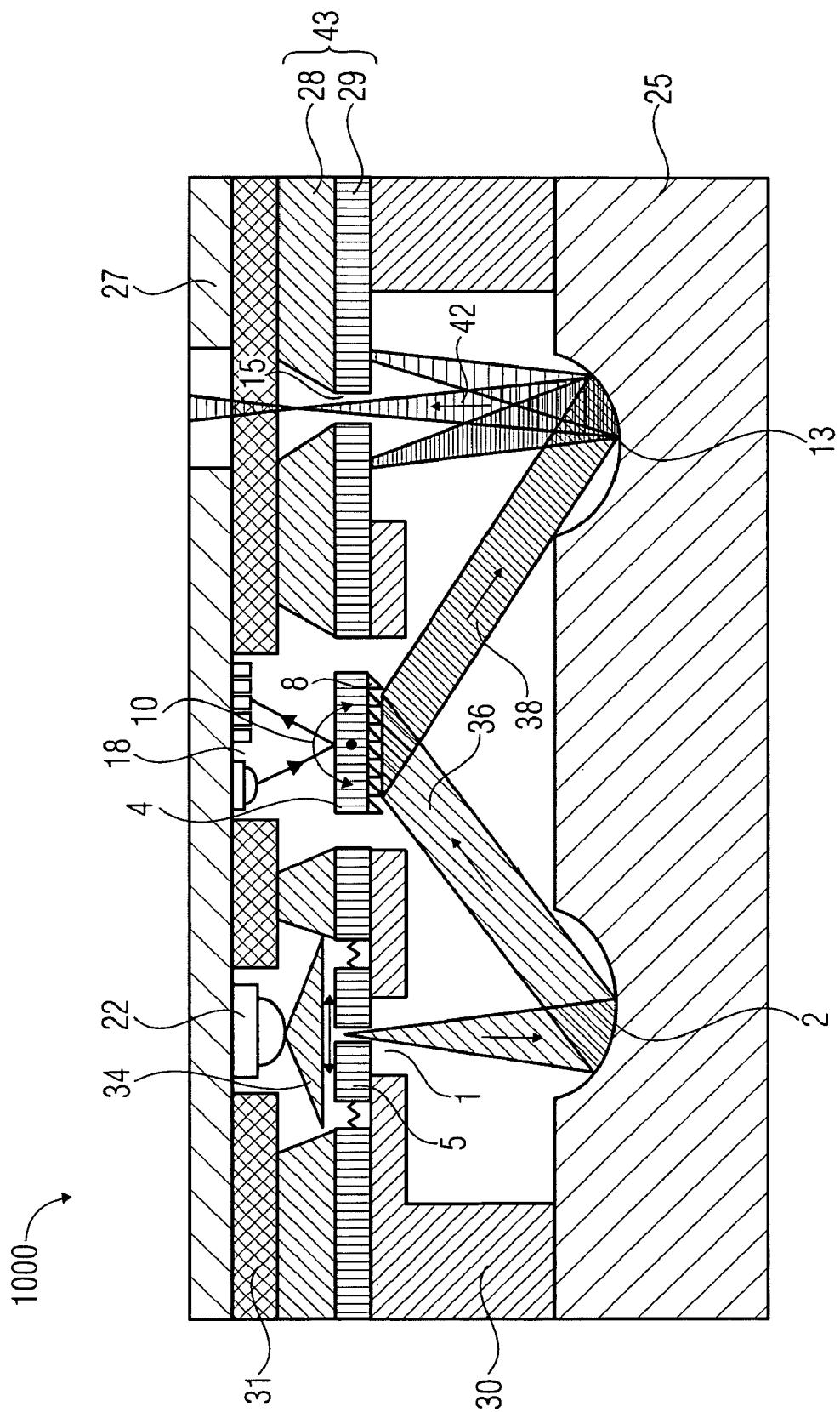
FIG. 10 is a fundamental outline, in the form of a cross-sectional representation, of an integrated, spectrally modulatable radiation source comprising a monochromator in accordance with the Czerny-Turner principle.

FIG. 10 shows a fundamental outline, in the form of a cross-sectional representation, of an integrated, spectrally modulatable radiation source comprising a monochromator in accordance with the Czerny-Turner principle in accordance with an embodiment of the invention. The radiation source is designated by 1000 in its entirety. The system comprises, in a successively stacked manner, an optical substrate 25, a first spacer substrate 30, a micromechanical substrate 43, a second spacer substrate 31, and a microelectronic substrate 27. The micromechanical substrate 43 may be an SOI wafer 28+29 (silicon-on-isolator wafer), for example, wherein 28 designates the handle layer of the SOI wafer, and 29 designates that layer of the SOI wafer within which a movable micromechanical functional element may be patterned. At the position where a movable micromechanical functional element is located, the handle layer is removed so as to enable unimpeded movement of the micromechanical functional element.

The basis for this embodiment, or an important element for this embodiment is, as in the embodiments of an MOEMS spectrometer 200, 300, 400, a monochromator in accordance with the Czerny-Turner principle. However, instead of the spectral decomposition 38 of the radiation 35 which has interacted with a sample, the radiation 34 coming from a radiation source 22, coming from a thermal radiation source, for example, is spectrally modulated, or decomposed 38. The spectrally modulatable MOEMS radiation source 1000 comprises a source 22 which emits electromagnetic radiation and may be arranged as a discrete element, for example as a light-emitting diode, on the microelectronic substrate 27, may be lithographically integrated or generated on same, such as an organic light-emitting diode, for example, or may be arranged as an assembly of its own, for example a halogen lamp. The radiation 34 emitted is locally and/or spatially filtered via a diaphragm 1, which may be fixedly integrated or may be designed as a movable/variable/modulatable diaphragm or location filter 5 integrated into the micromechanical substrate 43. Via a concave mirror 2, which is patterned into the optical substrate 25, the electromagnetic radiation 36 is collimated and spectrally split 38 by a dispersive element 8, such as by a diffraction grating, a photonic crystal, or a diffractive, optical element. The dispersive element 8 is integrated into or onto the surface of a micromechanical scanner mirror 4, both elements 4, 8 being patterned into or onto the micromechanical substrate 43. The radiation 38 which is spectrally split into various orders of diffraction within a range of angles is re-focused, via a further concave mirror 13 integrated into the optical substrate 25, on an exit diaphragm 15 integrated into the micromechanical substrate 43.

By means of a rotation 10 of the scanner mirror 4 and, thus, by means of the rotation of the dispersive element 8, the spectral portion of the electromagnetic radiation which is transmitted through the exit slit 15 is modulated, or changed. The detector module, which may be integrated by means of the same technology or may be manufactured as a separate module by means of a classical production method such as plastic injection molding, for example, detects the radiation which has interacted with the material of the sample.

The elements produced by the same technology are patterned in or on the same substrate in each case. For example, the concave mirrors 2, 13 are integrated in or on an optical substrate 25, such as in or on a borofloat glass wafer ("float glass": flat glass manufactured by a "float glass process"), a quartz glass wafer, a borosilicate glass wafer, a silicon wafer, or an SOI wafer, the slit diaphragms 1, 15, the scanner mirror 4, the dispersive element 8, such as a grating, for example, and, depending on the implementation, the adjustable or modulatable entrance diaphragm 5 are integrated in or on a micromechanical substrate 43, such as in or on a silicon wafer or an SOI wafer, the electronic circuits, the drive electronics for the scanner mirror 4, and the position detectors 18 comprising evaluation electronics for the scanner mirror 4 are integrated into or onto a microelectronic substrate 27.

The position detection unit 18 for detecting the deflection state of the micromechanical element may be arranged, for example in the area of the rear side of the micromechanical functional element, in or on the microelectronic substrate, and it may be configured to detect the deflection state of the micromechanical element by an optical method which evaluates the reflection of radiation by the rear side of the micromechanical element.

For a high level of reflectivity of the optically utilized surface areas, such as those of the concave mirrors or diffraction gratings, the surfaces of the substrates are partly or fully coated with aluminum or gold, for example. Optionally, surface areas which are unused optically may be coated with absorbent layers, such as PSK 2000, in order to reduce scattered light and extraneous light. The spacer substrates 30, 31 may be patterned both by lithographic technology, such as in or on a silicon wafer or on an SOI wafer, or they may be produced by means of a classical production method such as plastic injection molding, hot-stamping, milling or drilling. In order to minimize scattered light and extraneous light, the spacer substrates 30, 31 may also be provided with an absorbent coating.

The individual substrates are adjusted by using adjusting marks, for example. Alternatively, patterned stops, alignment structures or patterned, diffractive optical elements may be used on the substrates, for example. The individual substrates are glued to one another or interconnected by anodic bonding (connection method for connecting, for example, silicon substrates to glass substrates), for example at the areas of contact. The adhering surfaces may be configured such that the individual modules are closely encapsulated in each case. Electric contacting is enabled by a corresponding technology, such as so-called flip-chip bonding, for example (connection method in which chips, for example, are connected, with their contacting sides down, to another substrate or another component), so-called wire bonding (connection method in which various components, for example, are electrically connected to one another) with potential openings, or adhering using electrically conductive adhesive. Dicing of the radiation sources may be performed using a wafer saw, for example. After encapsulation and/or assembly into a housing, production of the radiation sources is completed.

Figure 11:
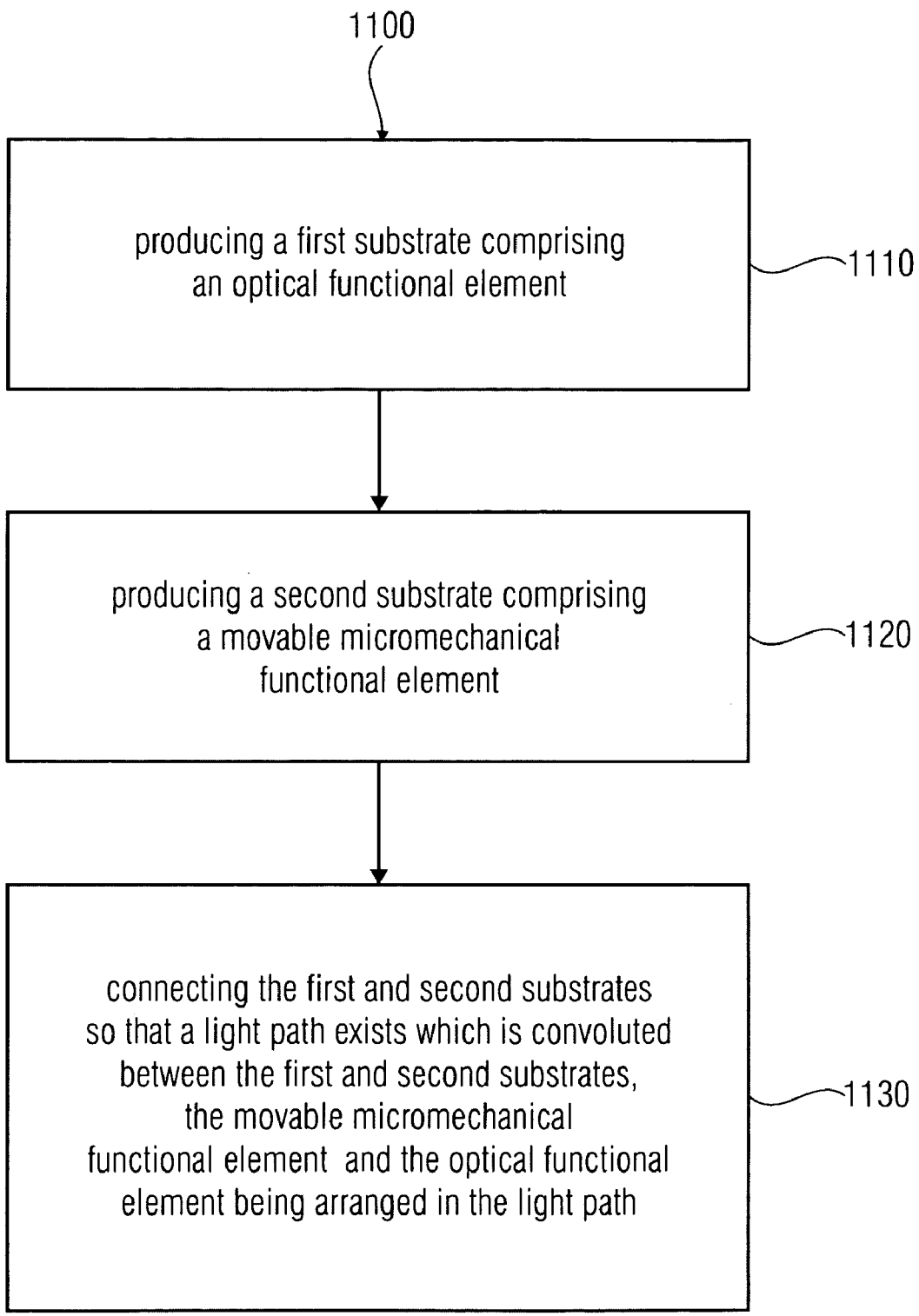
FIG. 11 is a flowchart of a method of producing an optical apparatus.

FIG. 11 shows a flowchart of a method of producing an optical apparatus in accordance with an embodiment of the invention. The method is designated by 1100 in its entirety and comprises producing 1110 a first substrate comprising an optical functional element, and producing 1120 a second substrate comprising a movable micromechanical functional element. In addition, the method comprises connecting the first substrate and the second substrate 1130, so that a light path is present which is convoluted between the first and second substrates, the movable micromechanical functional element and the optical functional element being arranged in the light path. The compact design, achieved in this manner, of an optical apparatus allows low-cost production of same, inter alia. The method 1100 may be supplemented by all of those aspects which are described herein with regard to the optical apparatus and with regard to the production of same. For example, the method may optionally be adapted to produce optical apparatuses in accordance with the embodiments described herein.

Figure 12:
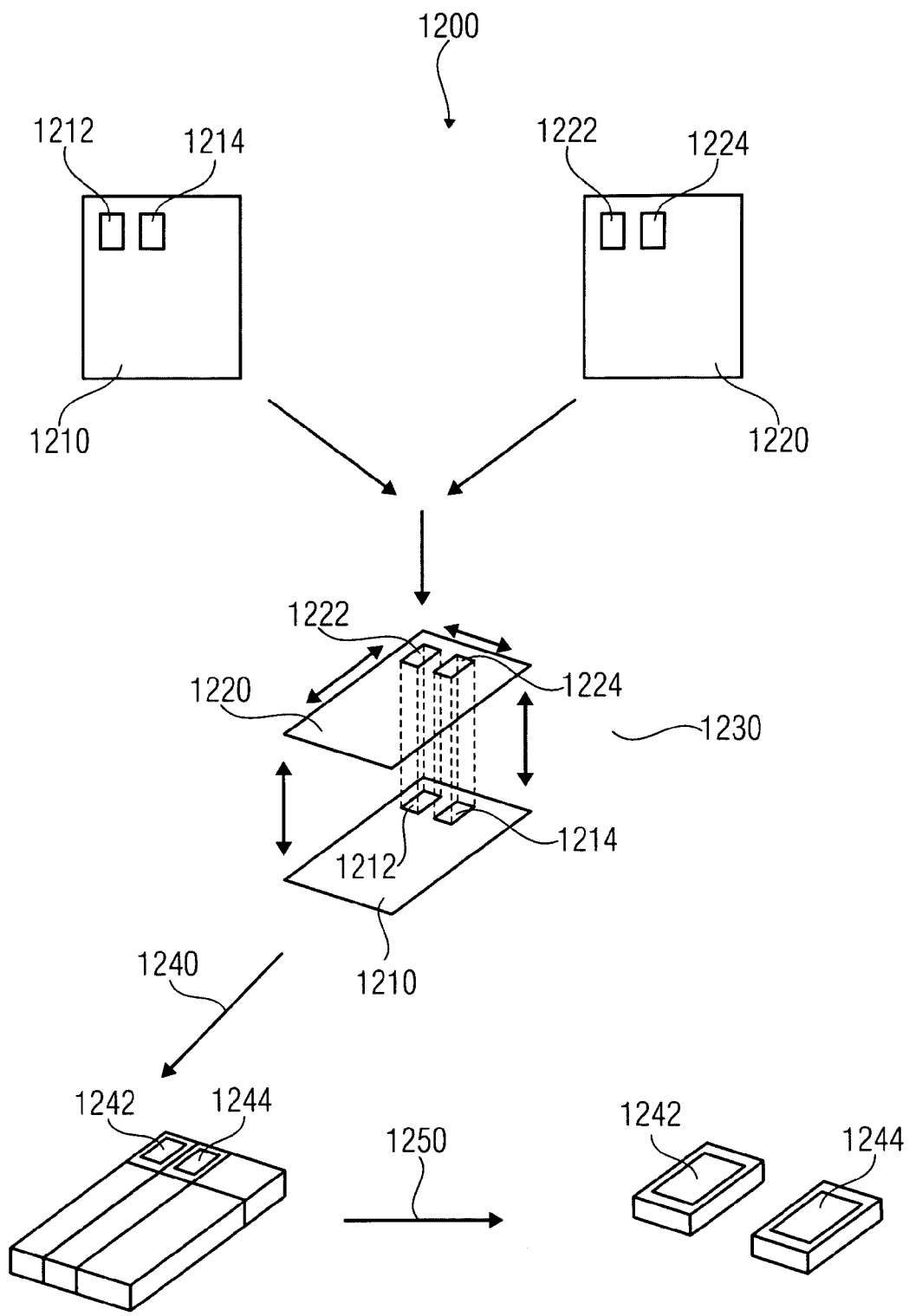
FIG. 12 is a schematic representation of part of a method of producing an optical apparatus, which part serves to produce a plurality of optical apparatuses at the same time or in one processing step.

FIG. 12 shows a schematic representation of part of a method of producing an optical apparatus, said part serving to produce a plurality of optical apparatuses simultaneously or at least within the framework of shared processing, in accordance with an embodiment of the invention. That part of the method which is shown is designated by 1200 in its entirety.

A first subsystem 1212 and a second subsystem 1214 identical with the first subsystem 1212 are produced in or on a first substrate 1210. In addition, a third subsystem 1222 and a fourth subsystem 1224 identical with the third subsystem 1222 are produced in or on a second substrate 1220. Subsequently, the first substrate 1210 and the second substrate 1220 are aligned toward each other (as is shown at reference numeral 1230) such that the third subsystem 1222 is arranged above the first subsystem 1212, and the fourth subsystem 1224 is arranged above the second subsystem 1214. This may be realized in a simple and accurate manner, for example using adjusting marks, adjusting structures or integrated diffractive optical elements. Thus aligned, the first substrate 1210 and the second substrate 1220 are indirectly or directly connected to each other (as is shown at reference numeral 1240). After that, an optical apparatus 1242 comprising the first subsystem 1212 and the third subsystem 1222 is separated from a second optical apparatus 1244 comprising the second subsystem 1214 and the fourth subsystem 1224, for example by wafer sawing (as is shown at reference numeral 1250). By simultaneous production of a plurality of optical apparatuses 1242, 1244 the cost per system may be clearly reduced.

Several embodiments in accordance with the invention as well as various partial aspects will be explained below.

Some embodiments in accordance with the invention comprise a system for wavelength-dissolved reception of electromagnetic radiation, the system consisting of at least one slit and/or at least one diaphragm and/or at least one detector for electromagnetic radiation and/or at least one further optical functional element and/or at least one micromechanical functional element for modulating electromagnetic radiation, the components being manufactured on and/or in substrates, and said substrates being realized as a stacked design of three or more substrates.

In accordance with one aspect, some embodiments in accordance with the invention comprise a system for receiving an electromagnetic spectrum, the system consisting of at least one substrate into which at least one optical functional element is integrated in each case, at least one further substrate having at least one opening for the propagation of electromagnetic radiation, at least one further substrate into which at least one micromechanical element for modulating electromagnetic radiation is integrated in each case, and at least one further substrate into which at least one electronic functional element is integrated in each case, the substrates being arranged in a stacked manner.

In accordance with a further aspect, the system may consist of a first substrate into which at least one optical functional element is integrated, a second substrate into which at least one micromechanical element for modulating electromagnetic radiation is integrated, a third substrate into which at least one electronic functional element is integrated, and a further substrate having at least one opening for the propagation of electromagnetic radiation, the substrates being arranged in a stacked manner.

In accordance with another aspect, the system may consist of a first substrate into which at least one optical functional element is integrated, a second substrate into which at least one micromechanical element for modulating electromagnetic radiation is integrated, a third substrate into which at least one electronic functional element is integrated, a fourth substrate into which at least one optical functional element is integrated, and a further substrate containing at least one opening for the propagation of electromagnetic radiation, the substrates being arranged in a stacked manner.

In accordance with a further aspect, the system may consist of a first substrate into which at least one optical functional element is integrated and which contains openings for the propagation of electromagnetic radiation, a second substrate into which at least one micromechanical element for modulating electromagnetic radiation is integrated, and a third substrate into which at least one electronic functional element is integrated, the substrates being arranged in a stacked manner.

In accordance with another aspect in the system, the substrate(s) comprising at least one optical functional element may consist of a material of the groups of material comprising glass, metal, plastic, plastic composites, of an element or a compound of elements of the periodic group IVa (such as carbon, silicon or germanium), of a compound of the elements of the periodic groups IIIa (such as boron, aluminum or gallium) and Va (such as nitrogen, phosphorus and arsenic), of a compound of the elements of the periodic groups IIb (such as zinc, cadmium or mercury) and VIa (such as oxygen, sulfur or selenium), or of one of the materials of quartz, sapphire, lithium niobate, lithium tantalate or barium titanate.

In accordance with a further aspect in the system, the substrate(s) comprising at least one opening for the propagation of electromagnetic radiation may consist of a material of the group of material comprising glass, metal, plastic, plastic composites, of an element or a compound of elements of the periodic group IVa, of a compound of the elements of the periodic groups IIIa and Va, of a compound of the elements of the periodic groups IIb and VIa, or of one of the materials of quartz, sapphire, lithium niobate, lithium tantalate or barium titanate.

In accordance with another aspect, in the system the substrate(s) comprising at least one micromechanical element may consist of a material of the groups of material comprising glass, metal, plastic, plastic composites, silicon, quartz glass, or of an SOI wafer, a silicon wafer or a quartz glass wafer.

In accordance with a further aspect, in the system the micromechanical element for modulating electromagnetic radiation may be configured as a rotary mirror comprising a grating structure for the purpose of spectrally splitting electromagnetic radiation.

In accordance with another aspect, in the system the micromechanical element for modulating electromagnetic radiation may be configured as a translationally movable element comprising a structure for laterally modulating electromagnetic radiation.

In accordance with a further aspect, in the system the micromechanical element for modulating electromagnetic radiation may be configured as a translationally movable element comprising a phase grating structure having a variable characteristic with regard to the phase and/or spacing of the grating.

In accordance with another aspect, in the system the substrate(s) comprising openings for the propagation of electromagnetic radiation may enable propagation of same between the functional elements patterned onto various substrates or into a substrate, and said substrate(s) may enable defined positions of the various substrates relative to each other because of the contact faces which are planar or are shaped accordingly.

In accordance with a further aspect, some embodiments of the system may be designed such that the substrate consists of materials, and/or is fully and/or partly provided with coatings, which enable absorption and/or reflectivity and/or transmission of electromagnetic radiation which is spectrally non-selective, complete and/or spectrally selective.

In accordance with another aspect, in the system the optical functional elements may have planar-optical and/or reflective and/or refractive and/or diffractive properties and/or have an influence on the polarization and/or an influence on the spectral composition of the radiation.

In accordance with a further aspect, in the system the optical functional elements having reflective properties may comprise mirror layers of metal and/or of a dielectric multi-layer system or of a combination of metal and a dielectric multi-layer system.

In accordance with another aspect, in the system additional slits and/or diaphragms of any shape may be integrated into the substrate which has the micromechanical element for modulating electromagnetic radiation integrated therein.

In accordance with a further aspect, in the system the slits and diaphragms may comprise spectrally and/or spatially and/or locally variable transmission and/or reflectivity.

In accordance with another aspect, in the system the substrates may comprise marks and/or patterns and/or diffractive optical elements for aligning or adjusting them relative to one another.

In accordance with a further aspect, in the system at least one detector consisting of at least one element may be used for detecting electromagnetic radiation.

In accordance with another aspect, in the system the detector may be implemented as a photodiode, avalanche photodiode (APD), phototransistor, photoresistor, charge-coupled sensor (CCD sensor), CMOS sensor, photocell, bolometer, or pyroelectric sensor.

In accordance with a further aspect, the system may contain at least one sensor for detecting the actuation state and/or deflection state and/or the state of motion of the micromechanical element.

In accordance with another aspect, the system may comprise a light source for illuminating objects of measurement.

In accordance with a further aspect, in the system the radiation source may consist of at least one thermal radiation source and/or at least one non-thermal radiation source and/or at least one light-emitting diode (LED) and/or at least one organic light-emitting diode (OLED) and/or at least one superluminescent diode and/or at least one laser.

In accordance with another aspect, in the system the substrate into which at least one electronic functional element is integrated in each case may contain integrated circuits which may be used for driving the micromechanical element and/or for driving/reading out the sensor for detecting the actuation state and/or for signal processing/reading out the detector for detecting electromagnetic radiation and/or for performing the signal pre-processing/signal evaluation of the signals of the detector and/or for driving the radiation source, and/or which contain data interfaces for communicating with other electronic appliances and/or electronic assemblies.

In accordance with a further aspect, the system may be configured to receive a spectrum in the UV and/or visible and/or infrared spectral ranges.

In accordance with another aspect, the system may comprise one or more substrates comprising a glass layer, a metal layer, a polymer layer, a plastic composite layer, a layer of sol-gel materials (sol-gel material: plastic-ceramic composite material such as "Oromocer", for example), a mono- or polycrystalline crystal layer, a quartz layer, a sapphire layer, a lithium niobate layer, a lithium tantalate layer, a barium titanate layer, a silicon layer, a layer consisting of an elemental semiconductor and/or a layer consisting of a compound semiconductor, and/or a silicon-on-isolator (SOI) layer design.

In accordance with a further aspect, the system may comprise one or more substrates consisting of a combination of several layers.

In accordance with another aspect, the system may comprise one or several substrates which partly or fully comprise at least one layer and/or one or several layer stacks and/or one or several patterned layer(s) for influencing the electromagnetic radiation, and which exhibit defined reflectivity and/or absorption and/or transmission.

In some embodiments in accordance with the invention, it is assumed that the terms micro-optical, micromechanical and microelectronic refer to feature sizes of less than 1 mm, and that micromechanical functional elements also comprise micro-electromechanical functional elements.

Generally, it is to be noted that in some of the embodiments shown, for example the optical element 1 is designed as a concrete element, such as a slit diaphragm, an entrance slit, or entrance aperture, a location or space filter, a reflective entrance diaphragm or entrance slit, a diaphragm or a bar designed as a reflective entrance slit, which is not to limit the potential embodiments, however. The same also applies to the optical element 2, which may be designed, for example, as a concave mirror or collimator, to the micromechanical element 5, which may be designed, for example, as a micromechanical modulator, translational microactuator with a slit diaphragm and a patterned membrane for modulating electromagnetic radiation, a translational microactuator with openings and a patterned membrane for modulating electromagnetic radiation, or a movable/variably modulatable diaphragm/location filter, to the reflective optical element 12, which may be designed, for example, as a plane mirror, mirrored face, inclined mirrored face, mirrored prisma or oblique mirror, to the optical element 13, which may be designed, for example, as a concave mirror or as re-focusing optics, to the optical element 15, which may be designed, for example, as an exit diaphragm, exit slit, exit aperture, location or space filter, diaphragm or slit diaphragm, and to the optical element 24, which may be designed, for example, as re-focusing optics of the illumination means, as optics for coupling in radiation, as an optical element for re-focusing, or as an imaging optical functional element.

In summary it may therefore be stated that in accordance with some embodiments in accordance with the invention, a spectrometer module may be designed by various principles in compliance with the design described and with the technology.

Some of the embodiments in accordance with the invention which are described herein describe variants of the design of a spectrometer module, the elements of which are distributed to different substrates in accordance with the lithographic technology that may be used.

In some embodiments in accordance with the invention, a detector may be configured, for example, as a individual detector, as a line scan detector, as a detector arrangement, as a detector array, or as a detector matrix.

In further embodiments in accordance with the invention, a substrate may be produced by means of micro-modeling method, such as by means of precession injection molding, by means of sol-gel modeling, by precession hot-stamping, or by means of galvanic modeling.

Some further embodiments in accordance with the invention relate to an optical apparatus comprising a spacer substrate between the first substrate and the second substrate.

In other embodiments in accordance with the invention, the individual substrates are indirectly or directly connected to one another.

In further embodiments in accordance with the invention, the optical functional element is arranged in or on the first substrate, and wherein the movable micromechanical functional element is arranged in or on the second substrate.

In yet further embodiments in accordance with the invention, one of the substrates comprises an opening, the opening comprising spectrally variable, spatially variable or locally variable transmission or reflectivity.

In still further embodiments in accordance with the invention, the first substrate and the second substrate comprise a means for aligning the first substrate and the second substrate relative to each other.

Some further embodiments in accordance with the invention relate to an apparatus wherein one or several substrates comprise a means for aligning the substrates relative to one another.

Still further embodiments in accordance with the invention relate to an apparatus wherein a substrate comprises a glass layer, a metal layer, a polymer layer, a plastic composite layer, a layer of sol-gel materials, a mono- or polycrystalline crystal layer, a quartz layer, a sapphire layer, a lithium niobate layer, a lithium tantalate layer, a barium titanate layer, a silicon layer, a layer consisting of an elemental semiconductor, a layer consisting of a compound semiconductor, or a silicon-on-insulator layer design.

Other embodiments in accordance with the invention relate to an apparatus wherein a substrate consists of a combination of several layers.

In other embodiments in accordance with the invention, the optical functional element exhibits planar-optical, reflective, refractive or diffractive properties or a combination of these properties, or is configured to influence the polarization or the spectral composition of the radiation.

In still further embodiments in accordance with the invention, the apparatus further comprises a detector with at least one element for detecting electromagnetic radiation.

Other embodiments in accordance with the invention relate to an apparatus comprising, for detecting radiation, a photodiode, an avalanche photodiode, a phototransistor, a photoresistor, a charge-coupled sensor, a CMOS sensor, a photocell, a bolometer, or a pyroelectric sensor.

Further embodiments in accordance with the invention relate to an apparatus comprising a thermal radiation source, a non-thermal radiation source, a light-emitting diode, an organic light-emitting diode, a superluminescent diode, or a laser.

In still further embodiments in accordance with the invention, the apparatus is configured to receive a spectrum within the ultraviolet, visible or infrared spectral ranges.

In some other embodiments in accordance with the invention, the apparatus is configured to enable wavelength-resolved reception of electromagnetic radiation.

Other embodiments in accordance with the invention relate to an apparatus comprising the first substrate with the optical functional element, the second substrate with the micromechanical functional element for spectrally modulating electromagnetic radiation, a third substrate with an electronic functional element, and a further substrate with an opening for the propagation of electromagnetic radiation.

In some other embodiments in accordance with the invention, the first substrate comprises an opening for coupling in or coupling out electromagnetic radiation, the micromechanical functional element being configured to effect spectral modulation of electromagnetic radiation, the apparatus comprising a third substrate with an electronic functional element.

In yet other embodiments in accordance with the invention, the first substrate and the second substrate comprise planar contact faces arranged opposite one another so as to enable alignment of the first substrate and of the second substrate relative to each other.

Further embodiments in accordance with the invention relate to an apparatus wherein the first substrate, the second substrate and the spacer substrate comprise planar contact faces arranged opposite one another so as to enable alignment of the first substrate, the second substrate and the spacer substrate relative to one another.

Still further embodiments in accordance with the invention relate to an apparatus wherein the first substrate and the second substrate comprise patterned contact faces arranged opposite one another, the contact face of the first substrate and the contact face of the second substrate being complementary to each other so as to enable alignment of the first substrate and the second substrate relative to each other.

In some other embodiments in accordance with the invention, the movable micromechanical functional element is configured to variably select a sub-range of the electromagnetic spectrum.

In still other embodiments in accordance with the invention, the apparatus comprises a sensor configured to detect the deflection state of the movable micromechanical functional element from the rear side of the movable micromechanical functional element using an optical apparatus.

Further embodiments in accordance with the invention relate to an apparatus configured to couple radiation in from a side of the first substrate which faces away from the second substrate, or to couple radiation out to the side of the first substrate which faces away from the second substrate.

Still further embodiments in accordance with the invention relate to an apparatus wherein a third substrate comprises a sensor for detecting the deflection state of a movable micromechanical functional element, and a detector for detecting electromagnetic radiation.

Further embodiments in accordance with the invention relate to a method wherein a further substrate is produced and is indirectly or directly connected to the first and second substrates.

Still further embodiments in accordance with the invention relate to a method wherein all of the movable micromechanical functional elements are produced in or on the same substrate.

In other embodiments in accordance with the invention, all of the imaging optical functional elements are produced in or on the same substrate.

Some other embodiments in accordance with the invention relate to a method wherein a first subsystem and a second subsystem identical with the first subsystem are produced in or on the first substrate, wherein a third subsystem and a fourth subsystem identical with the third subsystem are produced in or on the second substrate, wherein the first and second substrates are arranged such that after aligning the first substrate and the second substrate relative to each other, the third subsystem is opposite the first subsystem, and the fourth subsystem is opposite the second subsystem, wherein the substrates aligned relative to each other are indirectly or directly connected to obtain a connected stack of substrates which comprises a first optical apparatus having the first subsystem and the third subsystem, and a second optical apparatus having the second subsystem and the fourth subsystem, and wherein the first optical apparatus is separated, once the substrates have been connected, from the second optical apparatus in that the connected stack of substrates is divided.

In further embodiments in accordance with the invention, one of the substrates is produced using lithographic technology or a micro-modeling method.

In still further embodiments in accordance with the invention, the spacer substrate is produced using plastic injection molding, laser processing, milling or drilling.

In yet further embodiments in accordance with the invention, the substrates are positioned relative to one another using a means for alignment, said means being arranged in or on one of the substrates.

In some other embodiments in accordance with the invention, the individual substrates are connected using a joining technique or a mechanical fixing connection.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

The invention claimed is:

1. An optical apparatus, comprising:
  a first substrate comprising a focusing optical functional element;
  a second substrate comprising a movable micromechanical functional element;
  the first substrate and the second substrate being arranged and interconnected in a stacked manner and, so that a light path exists which is convoluted between the first substrate and the second substrate, the movable micromechanical functional element and the focusing optical functional element being arranged in the light path; and
  a third substrate comprising a microelectronic functional element, the second substrate being arranged between the first substrate and the third substrate.

2. The apparatus as claimed in claim 1, comprising a detector arranged in the light path, and the detector being arranged in or on the third substrate.

3. The apparatus as claimed in claim 1, comprising a detector arranged in the light path, and the detector being arranged between the movable micromechanical functional element of the second substrate and the third substrate or behind the movable micromechanical functional element of the second substrate in or on the third substrate.

4. The apparatus as claimed in claim 1, the apparatus comprising a spacer substrate between the second substrate and the third substrate.

5. The apparatus as claimed in claim 1, wherein one of the substrates comprises an opening to couple radiation into the light path or to couple radiation out from the light path, the opening additionally serving as a slit or diaphragm, and the opening comprising spectrally variable, spatially variable or locally variable transmission or reflectivity.

6. The apparatus as claimed in claim 1, wherein a substrate partially or completely comprises a layer, a stack of layers or a patterned layer for influencing electromagnetic radiation, and exhibits defined reflectivity, absorption or transmission, or a combination of these properties.

7. The apparatus as claimed in claim 1, comprising a radiation source for illuminating objects of measurement.

8. The apparatus as claimed in claim 1, configured to enable wavelength-resolved reception of electromagnetic radiation, and comprising a slit, a diaphragm, a detector, a further optical functional element, and a micromechanical functional element for modulating electromagnetic radiation, the elements being arranged on at least three substrates.

9. The apparatus as claimed in claim 1, configured to receive an electromagnetic spectrum, the apparatus comprising the first substrate with the focusing optical functional element, the second substrate with the micromechanical functional element for spectrally modulating electromagnetic radiation, and a further substrate with an opening for the propagation of electromagnetic radiation.

10. The apparatus as claimed in claim 1, configured to variably select a sub-range from an electromagnetic spectrum, and to provide the sub-range selected.

11. The apparatus as claimed in claim 1, wherein the movable micromechanical functional element comprises a rotary mirror with a grating structure, a translationally movable element with a phase grating structure comprising a variable characteristic with regard to the phase or to the spacing of the grating, a translationally movable element with a pattern for laterally influencing electromagnetic radiation, or a translationally movable mirror for optical path length modulation.

12. The apparatus as claimed in claim 1, comprising a sensor for detecting the deflection state of the movable micromechanical functional element.

13. The apparatus as claimed in claim 1, comprising the third substrate with the microelectronic functional element, configured to drive the movable micromechanical functional element, to drive and read out a sensor for detecting the deflection state of the movable mechanical functional element, to signal-process and read out a detector for detecting electromagnetic radiation, to perform signal pre-processing or signal evaluation of a signal provided by the detector, to drive a radiation source or to communicate with other electronic appliances or assemblies.

14. The apparatus as claimed in claim 1, wherein a spacer substrate comprises a pattern for minimizing scattered light.

15. The apparatus as claimed in claim 1, wherein all imaging optical functional elements located in the convoluted light path between the first substrate and the second substrate are arranged in or on the first substrate.

16. The apparatus as claimed in claim 1, configured to enable wavelength-dependent reception of electromagnetic radiation; and comprising a light path from a slit diaphragm, which is arranged in the second substrate, to a concave mirror, which is arranged in or on the first substrate, to the movable micromechanical functional element, which comprises a dispersive element for spectrally splitting the electromagnetic radiation and is arranged in or on the second substrate, to a concave mirror, which is arranged in or on the first substrate, and to an exit slit, which is arranged before a detector.

17. The apparatus as claimed in claim 1, configured to enable wavelength-dependent reception of electromagnetic radiation; and comprising a light path from an imaging optical functional element, which is arranged in or on the substrate, to a reflective entrance slit, which is arranged in or on the second substrate, to a concave mirror, which is arranged in or on the first substrate, to the movable micromechanical functional element, which comprises a dispersive element for spectrally splitting the electromagnetic radiation and is arranged in or on the second substrate, to a concave mirror, which is arranged in or on the first substrate, and to an exit slit, which is arranged before a detector.

18. The apparatus as claimed in claim 1, wherein a further substrate comprising additional functional elements is arranged between the first substrate and the second substrate, the apparatus being configured to enable wavelength-dependent reception of electromagnetic radiation; and comprising a light path from a slit diaphragm, which is arranged in or on the second substrate or in or on the further substrate, to an imaging optical element, which is arranged in or on the first substrate, to an imaging optical element, which is arranged in or on the further substrate, to an imaging optical element, which is arranged in or on the first substrate, to the movable micromechanical functional element, which comprises a rotary face with a dispersive element for sequentially scanning the entrance slit and for spectrally splitting the electromagnetic radiation, and which is arranged in or on the second substrate, to an imaging optical element, which is arranged in or on the first substrate, to an imaging optical element, which is arranged in or on the further substrate, to an imaging optical element, which is arranged in or on the first substrate, and to a detector.

19. The apparatus as claimed in claim 1, configured to enable wavelength-dependent reception of electromagnetic radiation; and comprising a light path from a slit diaphragm, which is arranged in the second substrate, to a concave mirror, which is arranged in or on the first substrate, to a planar optical element, which is arranged in or on the second substrate, to a dispersive element, which is arranged in or on the first substrate, to a planar optical element, which is arranged in or on the second substrate, to a concave mirror, which is arranged in or on the first substrate, to an exit diaphragm, which is arranged in a spacer substrate, to the movable micromechanical functional element, which is implemented as a modulator and is arranged in or on the second substrate, and to a detector.

20. The apparatus as claimed in claim 1, configured to enable wavelength-dependent reception of electromagnetic radiation; and comprising a light path from a slit diaphragm, which is arranged in the second substrate, to a concave mirror, which is arranged in or on the first substrate, to a dispersive element, which is arranged in or on the second substrate, to a concave mirror, which is arranged in or on the first substrate, to an exit diaphragm, which is arranged in a spacer substrate, to the movable micromechanical functional element, which is implemented as a modulator and is arranged in or on the second substrate, and to a detector.

21. The apparatus as claimed in claim 1, configured to enable wavelength-dependent reception of electromagnetic radiation; and comprising a light path from the movable micromechanical functional element, which is implemented as a modulator and is arranged in or on the second substrate, to a slit diaphragm, which is arranged in a spacer substrate, to a concave mirror, which is arranged in or on the first substrate, to a dispersive element, which is arranged in or on the second substrate, to a concave mirror, which is arranged in or on the first substrate, and to an exit slit, which is arranged before a detector.

22. The apparatus as claimed in claim 1, comprising a detector and being configured to enable wavelength-dependent reception of electromagnetic radiation; and comprising a light path from a slit diaphragm, which is arranged in the second substrate, to a concave mirror, which is arranged in or on the first substrate, to a mirrored prisma, which is arranged in or on the second substrate, to an optical element, which is arranged in or on the first substrate, to an exit diaphragm, which is arranged in a spacer substrate, to the movable micromechanical functional element, which is implemented as a spectrally tunable filter and is arranged in or on the second substrate, and to the detector.

23. The apparatus as claimed in claim 1, configured to enable wavelength-dependent reception of electromagnetic radiation; and comprising a light path from a slit diaphragm, which is arranged in the second substrate, to a concave mirror, which is arranged in or on the first substrate, to the movable micromechanical functional element, which is implemented as a binary phase grating with variable phase depth for spectrally modulating the electromagnetic radiation, and which is arranged in or on the second substrate, to a concave mirror, which is arranged in or on the first substrate, and to an exit slit, which is arranged before a detector.

24. The apparatus as claimed in claim 1, configured to variably select a sub-range from the electromagnetic spectrum, and to provide the sub-range selected; and comprising a light path from a radiation source to a diaphragm, which is configured as a diaphragm, which is configured as a movable micromechanical functional element, to a concave mirror, which is arranged in or on the first substrate, to the movable micromechanical functional element, which comprises a dispersive element for spectrally splitting the electromagnetic radiation, and which is arranged in or on the second substrate, to a concave mirror, which is arranged in or on the first substrate, and to an exit diaphragm.

25. A method of producing an optical apparatus, comprising:

producing a first substrate comprising a focusing optical functional element;

producing a second substrate comprising a movable micromechanical functional element;

producing a third substrate comprising a moveable microelectronic functional element;

connecting the first and second substrates in a stacked manner, so that a light path is formed which is convoluted between the first and second substrates, the movable micromechanical functional element and the focusing optical functional element being arranged in the light path;

connecting the second and third substrates such that the second substrate is arranged between the first and third substrates.

* * * * *